(12) United States Patent
Cui et al.

(10) Patent No.: US 11,855,294 B2
(45) Date of Patent: Dec. 26, 2023

(54) METAL-HYDROGEN BATTERIES FOR LARGE-SCALE ENERGY STORAGE

(71) Applicant: The Board of Trustees of the Leland Stanford Junior University, Stanford, CA (US)

(72) Inventors: Yi Cui, Stanford, CA (US); Wei Chen, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 162 days.

(21) Appl. No.: 16/058,607

(22) Filed: Aug. 8, 2018

(65) Prior Publication Data

US 2019/0051907 A1 Feb. 14, 2019

Related U.S. Application Data

(60) Provisional application No. 62/544,508, filed on Aug. 11, 2017.

(51) Int. Cl.

| | |
|---|---|
| *H01M 4/86* | (2006.01) |
| *H01M 4/88* | (2006.01) |
| *H01M 8/04089* | (2016.01) |
| *H01M 4/38* | (2006.01) |
| *H01M 4/90* | (2006.01) |

(Continued)

(52) U.S. Cl.
CPC .......... *H01M 4/8615* (2013.01); *H01M 4/38* (2013.01); *H01M 4/8807* (2013.01); *H01M 4/8825* (2013.01); *H01M 4/9041* (2013.01); *H01M 8/04089* (2013.01); *H01M 12/08* (2013.01); *H01M 2004/028* (2013.01); *H01M 2004/8684* (2013.01); *H01M 2300/0014* (2013.01)

(58) Field of Classification Search
CPC .... H01M 4/8615; H01M 4/38; H01M 4/8807; H01M 4/8825; H01M 4/9041; H01M 8/04089; H01M 12/08; H01M 2004/028; H01M 2004/8684; H01M 2300/0014; H01M 10/345
See application file for complete search history.

(56) References Cited

U.S. PATENT DOCUMENTS

| | | |
|---|---|---|
| 3,544,375 A | 12/1970 | Ruben |
| 4,159,367 A | 6/1979 | Berchielli et al. |

(Continued)

FOREIGN PATENT DOCUMENTS

| | | | |
|---|---|---|---|
| CN | 102534283 A | * | 7/2012 |
| CN | 102534283 A | | 7/2012 |

(Continued)

OTHER PUBLICATIONS

Li et al., "Nanostructured catalysts for electrochemical water splitting: current state and prospects." J. Mater. Chem. A. 2016. 4, p. 11973-12000 (Year: 2016).*

(Continued)

*Primary Examiner* — Brittany L Raymond

(57) ABSTRACT

A metal-hydrogen battery includes a first electrode, a second electrode, and an electrolyte disposed between the first electrode and the second electrode. The second electrode includes a bi-functional catalyst to catalyze both hydrogen evolution reaction and hydrogen oxidation reaction at the second electrode.

16 Claims, 21 Drawing Sheets

(51) Int. Cl.
*H01M 12/08* (2006.01)
*H01M 4/02* (2006.01)

(56) References Cited

U.S. PATENT DOCUMENTS

| | | | | |
|---|---|---|---|---|
| 4,460,660 | A | | 7/1984 | Kujas |
| 5,618,392 | A | | 4/1997 | Furuya |
| 5,695,530 | A | * | 12/1997 | Hong .................. H01M 4/0445 29/623.1 |
| 9,780,424 | B2 | | 10/2017 | Graves et al. |
| 2004/0011444 | A1 | * | 1/2004 | Okada .................. C01B 3/0005 148/712 |
| 2005/0153204 | A1 | | 7/2005 | Fierro et al. |
| 2006/0293173 | A1 | | 12/2006 | Zhang et al. |
| 2011/0130269 | A1 | | 6/2011 | Dopp et al. |
| 2011/0223494 | A1 | * | 9/2011 | Feaver .................. H01M 4/463 429/405 |
| 2011/0244363 | A1 | | 10/2011 | Min et al. |
| 2013/0344407 | A1 | | 12/2013 | Mick |
| 2014/0023939 | A1 | | 1/2014 | Chen et al. |
| 2015/0364789 | A1 | * | 12/2015 | Ogawa .................. H01M 4/42 429/314 |
| 2017/0342578 | A1 | * | 11/2017 | Tour .................. H01M 4/9041 |

FOREIGN PATENT DOCUMENTS

| | | | |
|---|---|---|---|
| CN | 104798247 | A | 7/2015 |
| CN | 106119652 | A | 11/2016 |
| JP | S47-012458 | B1 | 4/1972 |
| JP | H06-093486 | A | 4/1994 |
| JP | 2007-518244 | A | 7/2007 |
| JP | 2009-221072 | A | 10/2009 |
| KR | 20070021110 | A | 2/2007 |
| KR | 20110111745 | A | 10/2011 |
| KR | 20120130184 | A | 11/2012 |
| WO | 8504287 | A1 | 9/1985 |
| WO | 2005038953 | A2 | 4/2005 |
| WO | 2008070039 | A2 | 6/2008 |
| WO | 2011089522 | A2 | 7/2011 |
| WO | WO-2011/089522 | A2 | 7/2011 |

OTHER PUBLICATIONS

Wei et al. CN102534283A espacenet translation (Year: 2012).*
Li et al., "Electrodeposited ternary iron-cobalt-nickel catalyst on nickel foam for efficient water electrolysis at high current density." Colloids and Surfaces A: Physiochemical and Engineering Aspects. Oct. 5, 2016. vol. 506, p. 694-702 (Year: 2016).*
Yue et al., "Synthesis and Electrochemical Properties of Nano-Micro Spherical β-Ni(OH)2 with Super High Charge-Discharge Speed," Industrial & Engineering Chemical Research. Jun. 7, 2012. vol. 51, p. 8358-8365 (Year: 2012).*
International Search Report and Written Opinion in PCT/US2018/045816, dated Nov. 26, 2018, 14 pages.
Extended European Search Report for EP Application No. 18845281.7 dated Mar. 31, 2021, 9 pages.
Raj, "Nickel Based Composite Electrolytic Surface Coatings as Electrocatalysts for the Cathodes in the Energy Efficient Industrial Production of Hydrogen from Alkaline Water Electrolytic Cells", International Journal of Hydrogen Energy, Elsevier Science Publishers B.V., Barking, GB, vol. 17, No. 6, Jun. 1, 1992, pp. 413-421.
Raj et al., "Transition Metal-Based Cathodes for Hydrogen Evolution in Alkaline Solution: Electrocatalysis on Nickel-Based Ternary Electrolytic Codeposits", Journal of Applied Electrochemistry, vol. 22, Jan. 1, 1992, pp. 471-477.
Di Gao et al., "Three-Dimensional Dendritic Structures of NiCoMo as Efficient Electrocatalysts for the Hydrogen Evolution Reaction", ACS Appl. Mater. Interfaces, 2017, vol. 9, issue 27, pp. 22420-22431.
Sheng et al., "Non-previous metal electrocatalysts with high activity for hydrogen oxidation reaction in alkaline electrolytes", Energy & Environmental Science, 2014, vol. 7, issue 5, pp. 1719-1724.
Sakamoto et al., "Study of Pt-free anode catalysts for anion exchange membrane fuel cells", Catalysis Today, vol. 164, Dec. 4, 2010, p. 181-185.
Notice of Allowance issued for Japanese Application No. 2020-505397, dated Aug. 2, 2023, 6 pages, which cites JP S47-012458 B1.

* cited by examiner

METAL-HYDROGEN BATTERIES FOR LARGE-SCALE ENERGY STORAGE

CROSS-REFERENCE TO RELATED APPLICATION

This application claims the benefit of U.S. Provisional Application No. 62/544,508, filed Aug. 11, 2017, the contents of which are incorporated herein by reference in their entirety.

BACKGROUND

For renewable energy resources such as wind and solar to be competitive with traditional fossil fuels, large-scale energy storage systems should be developed to mitigate their intrinsic intermittency. The cost (US dollar per kilowatt-hour ($ kWh$^{-1}$)) and long-term lifetime are the utmost figures of merit for large-scale energy storage. Currently, pumped-hydroelectric storage dominates the grid energy storage market because it is an inexpensive way (about $100 kWh$^{-1}$) to store large quantities of energy over a long period of time (about 50 years), but it is constrained by the lack of suitable sites and the environmental footprint. Other technologies such as compressed air and flywheel energy storage show some different advantages, but their relatively low efficiency and high cost should be significantly improved for grid storage. Rechargeable batteries offer great opportunities to target low-cost, high capacity and highly reliable systems for large-scale energy storage. Representative of the battery technologies include lead-acid, redox-flow, lithium-ion, sodium-sulfur and liquid-metal; however, these technologies can hardly fulfill the overall economic criteria for the large utility market due to a variety of unsolved issues. In order to achieve the United States Department of Energy (DOE) target of $100 kWh$^{-1}$ for grid storage, improved battery technology and advanced materials are highly desirable yet very challenging.

It is against this background that a need arose to develop embodiments of this disclosure.

SUMMARY

In some embodiments, a metal-hydrogen battery includes (1) a first electrode, (2) a second electrode, and (3) an electrolyte disposed between the first electrode and the second electrode. The second electrode includes a bi-functional catalyst to catalyze both hydrogen evolution reaction and hydrogen oxidation reaction at the second electrode.

In some embodiments, a metal-hydrogen battery includes (1) a cathode including a redox-reactive material that includes a transition metal, (2) a catalytic hydrogen anode including a bi-functional catalyst that includes a transition metal alloy, and (3) an alkaline electrolyte disposed between the cathode and the catalytic hydrogen anode.

In some embodiments, a manufacturing method of a catalytic hydrogen electrode includes (1) providing a conductive substrate and a deposition solution in contact with the conductive substrate, wherein the deposition solution includes precursors of a bi-functional catalyst, and (2) performing electrodeposition to form a coating of the bi-functional catalyst covering the conductive substrate.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

Figure 22:
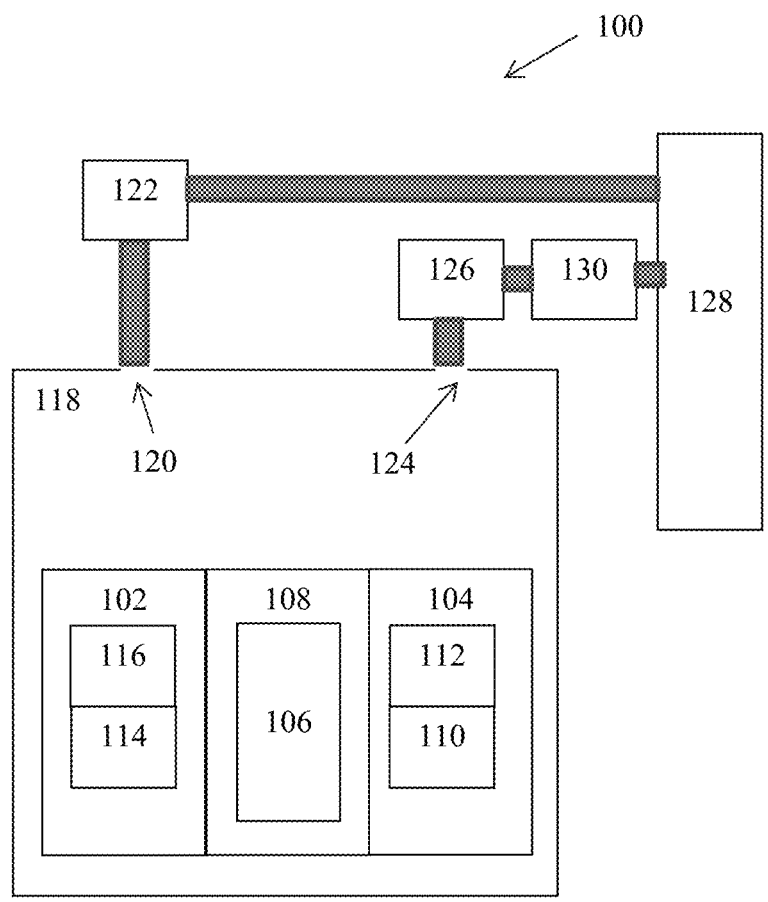
FIG. 22. Schematic of a metal-hydrogen battery according to some embodiments.

FIG. 22 shows a schematic of a metal-hydrogen battery 100 according to some embodiments. The metal-hydrogen battery 100 includes a first electrode 102, a second electrode 104, a separator 106 disposed between the first electrode 102 and the second electrode 104, and an electrolyte 108 disposed between the first electrode 102 and the second electrode 104.

In some embodiments, the second electrode 104 is a catalytic hydrogen electrode. In some embodiments, the second electrode 104 includes a conductive substrate 110 and a coating 112 covering the conductive substrate 110, and where the coating 112 includes a bi-functional catalyst to catalyze both hydrogen evolution reaction and hydrogen oxidation reaction at the second electrode 104. In some embodiments, the conductive substrate 110 is porous, such as having a porosity of at least about 10%, at least about 20%, at least about 30%, at least about 40%, or at least about 50%, and up to about 80%, up to about 90%, or greater. In some embodiments, the conductive substrate 110 is a metal foam, such as a nickel foam, a copper foam, a steel foam, an aluminum foam, or others. In some embodiments, the conductive substrate 110 is a metal alloy foam, such as a nickel-molybdenum foam, a nickel-copper foam, a nickel-cobalt foam, a nickel-tungsten foam, a nickel-silver foam, a nickel-molybdenum-cobalt foam, or others. Other conductive substrates are encompassed by this disclosure, such as metal foils, metal meshes, and fibrous conductive substrates. In some embodiments, the conductive substrates are carbon-based materials, such as carbon fibrous paper, carbon cloth, carbon felt, carbon mat, carbon nanotube film, graphite foil, graphite foam, graphite mat, graphene foil, graphene fibers, graphene film, and graphene foam. In some embodiments, the bi-functional catalyst is different from, or is devoid of, platinum. In some embodiments, the bi-functional catalyst is a nickel-molybdenum-cobalt alloy. Other transition metal alloys as bi-functional catalysts are encompassed by this disclosure, such as nickel-molybdenum, nickel-tungsten, nickel-tungsten-cobalt, nickel-carbon based composites. Other precious metals and their alloys as bi-functional catalysts are encompassed by this disclosure, such as platinum, palladium, iridium, gold, rhodium, silver, and their alloys with precious and non-precious transition metals such as platinum, palladium, iridium, gold, rhodium, silver, nickel, cobalt, manganese, iron, molybdenum, tungsten, and so forth. In some embodiments, bi-functional catalysts are a combination of hydrogen evolution reaction and hydrogen oxidation reaction catalysts. In some embodiments, the bi-functional catalysts of the metal-hydrogen battery 100 include a mixture of different materials, which contribute to hydrogen evolution and oxidation reactions as a whole. In some embodiments, the second electrode 104 is an anode or a cathode. In some embodiments, the coating 112 includes nanostructures of the bi-functional catalyst, such as having sizes (or an average size) in a range of about 1 nm to about 100 nm, about 1 nm to about 80 nm, or about 1 nm to about 50 nm.

In some embodiments, the first electrode 102 includes a conductive substrate 114 and a coating 116 covering the conductive substrate 114, and where the coating 116 includes a redox-reactive material that includes a transition metal. In some embodiments, the conductive substrate 114 is porous, such as having a porosity of at least about 10%, at least about 20%, at least about 30%, at least about 40%, or at least about 50%, and up to about 80%, up to about 90%, or greater. In some embodiments, the conductive substrate 114 is a metal foam, such as a nickel foam, or a metal alloy foam. Other conductive substrates are encompassed by this disclosure, such as metal foils, metal meshes, and fibrous conductive substrates. In some embodiments, the transition metal included in the redox-reactive material is nickel. In some embodiments, nickel is included as nickel hydroxide or nickel oxyhydroxide. In some embodiments, the transition metal included in the redox-reactive material is cobalt. In some embodiments, cobalt is included as cobalt oxide or zinc cobalt oxide. In some embodiments, the transition metal included in the redox-reactive material is manganese. In some embodiments, manganese is included as manganese oxide or doped manganese oxide (e.g., doped with nickel, copper, bismuth, cobalt or other transition or post-transition metals). Other transition metals are encompassed by this disclosure, such as silver. In some embodiments, the first electrode 102 is a cathode, and the second electrode 104 is an anode. In some embodiments, the coating 116 includes microstructures of the redox-reactive material, such as having sizes (or an average size) in a range of about 1 μm to about 100 μm, about 1 μm to about 50 μm, or about 1 μm to about 10 μm.

In some embodiments, the first electrode 102 includes a metal foil that includes a transition metal. In some embodiments, the transition metal is zinc. Other transition metals are encompassed by this disclosure, such as silver. In some embodiments, the first electrode 102 is an anode, and the second electrode 104 is a cathode.

In some embodiments, the electrolyte 108 is an aqueous electrolyte. In some embodiments, the aqueous electrolyte is alkaline and has a pH greater than 7, such as about 7.5 or greater, about 8 or greater, about 8.5 or greater, or about 9 or greater.

In some embodiments, the battery 100 also includes an enclosure 118 within which the first electrode 102, the second electrode 104, the separator 106, and the electrolyte 108 are disposed. In some embodiments, the enclosure 118 includes or defines an inlet 120, which is fluidly connected to an inlet valve 122, and an outlet 124, which is fluidly connected to an outlet valve 126. In some embodiments, the battery 100 also includes a storage tank 128 to store hydrogen gas, and an optional pump 130 fluidly connected between the outlet 124, through the outlet valve 126, and the storage tank 128, and where the pump 130 is configured to direct a flow of hydrogen gas from the enclosure 118 to the storage tank 128. The storage tank 128 is also fluidly connected to the inlet 120, through the inlet valve 122, to allow a flow of hydrogen gas from the storage tank 128 to the enclosure 118.

Additional embodiments of this disclosure are directed to a manufacturing method of a catalytic hydrogen electrode which includes providing a conductive substrate and a deposition solution in contact with the conductive substrate, and where the deposition solution includes precursors of a bi-functional catalyst. In some embodiments, the method also includes performing electrodeposition to form a coating of the bi-functional catalyst covering the conductive substrate. In some embodiments, the bi-functional catalyst is a nickel-molybdenum-cobalt alloy, and the deposition solution includes a nickel-containing precursor, a molybdenum-containing precursor, and a cobalt-containing precursor.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Overview: Large-scale energy storage is of significance to the integration of renewable energy into an electrical grid. Despite the dominance of pumped hydroelectricity in the market of grid energy storage, it is constrained by suitable site selection and footprint impact. Rechargeable batteries have attracted increasing interest in the large-scale energy storage; however, the challenging criteria of low cost materials that cycle with negligible capacity fade restricts most battery chemistries (Li-ion; lead acid; redox-flow; sodium-sulfur; etc.) for use in the grid storage. Here, this example is directed to a class of battery chemistry termed as "metal-hydrogen" batteries by pairing earth-abundant transition metal cathodes (e.g., nickel, manganese, cobalt, etc.) with a low-cost, bi-functional nickel-molybdenum-cobalt alloy catalyzed hydrogen anode in an alkaline electrolyte. The batteries operate by redox reactions of metal oxides at the cathode and highly reversible hydrogen evolution/oxidation reactions at the anode. Among the developed Ni—, Co—, Mn—, and Zn—$H_2$ batteries, the Ni—$H_2$ battery exhibits a high energy density of about 140 Wh $kg^{-1}$ (or more) and excellent rechargeability with negligible capacity decay over 1500 cycles (or more). The cost of the Ni—$H_2$ cells achieves as low as about \$83 per kilowatt-hour, demonstrating attractive characteristics for large-sale energy storage.

Results and Discussion: This example is directed to a category of low-cost transition metal-based hydrogen batteries that show great promise for large-scale energy storage. The proposed metal-hydrogen (M-$H_2$) batteries include a redox-reactive metal cathode and a catalytic hydrogen anode in an alkaline electrolyte. The batteries operate by electrochemical redox-reactions at the cathode and highly reversible hydrogen evolution/oxidation reactions (HER/HOR) at the anode. Successful application is performed for a nickel-molybdenum-cobalt (NiMoCo) bi-functional HER/HOR catalyst as the low-cost anode. Meanwhile, a series of earth-abundant transition metals such as nickel (Ni), manganese (Mn), and cobalt (Co) have been utilized as cathodes, making the development of the M-$H_2$ batteries by inexpensive transition metals. Among the developed M-$H_2$ batteries, the advanced nickel-hydrogen (Ni—$H_2$) cell is of particular interest because the cathode nickel hydroxide/oxyhydroxide ($Ni(OH)_2$/NiOOH) reaction is highly rechargeable under alkaline conditions.

Figure 1:
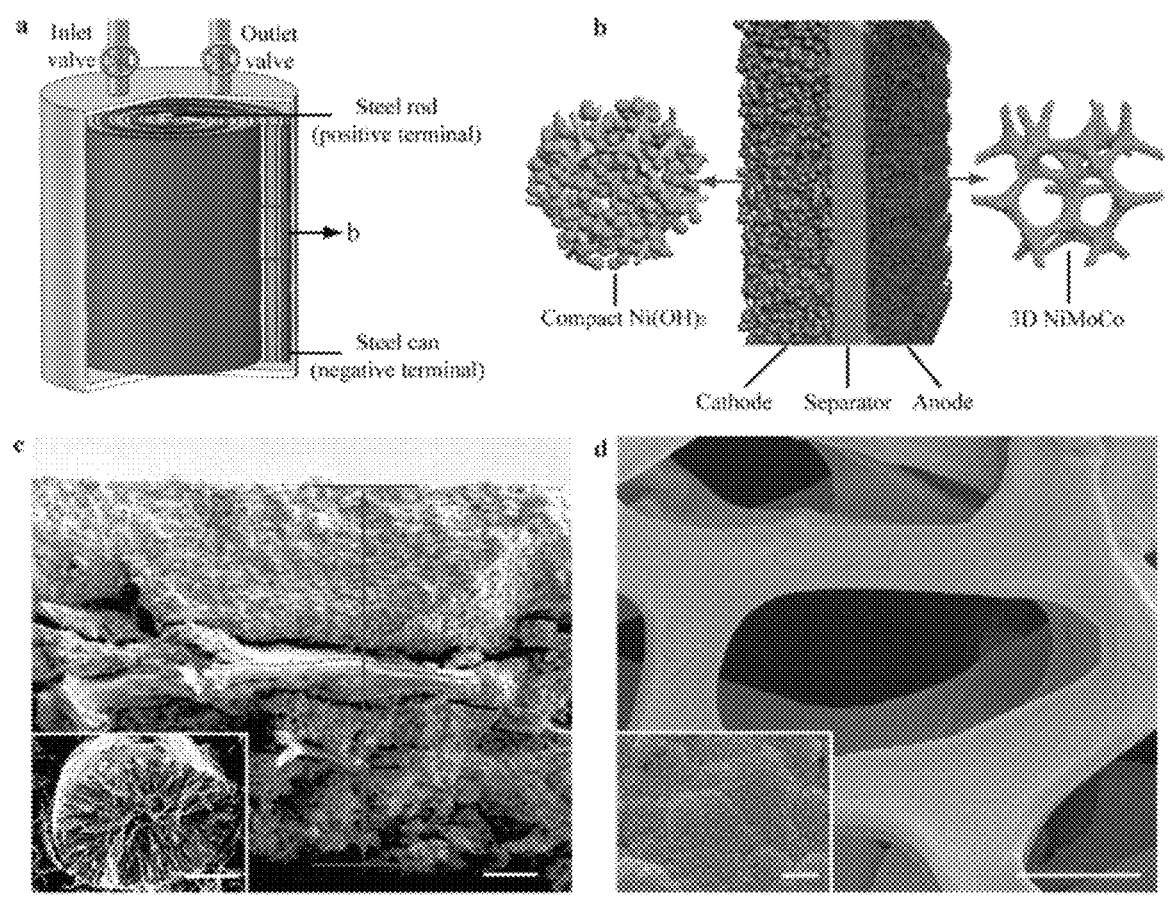
FIG. 1. An advanced Ni—H$_2$ cylindrical battery. a, Schematic of the Ni—H$_2$ cylindrical cell design. b, Electrode configuration and specification of the Ni—H$_2$ cell. c, A cross sectional scanning electron microscopy (SEM) image shows that the thickness of the cathode is about 700 µm; scale bar, 100 µm. The inset SEM image shows that the cathode is comprised of Ni(OH)$_2$ microspheres; scale bar, 5 µm. The compact Ni(OH)$_2$ cathode has a high tap density of about 2.6 g cm$^{-3}$ and a mass loading of about 182 mg cm$^{-2}$ with respect to the active Ni(OH)$_2$. d, An SEM of the 3D NiMoCo anode; scale bar, 100 µm. The inset SEM shows the NiMoCo nanoparticles on the nickel foam; scale bar, 1 µm. The NiMoCo anode has a thickness of about 200 µm.
Figure 5:
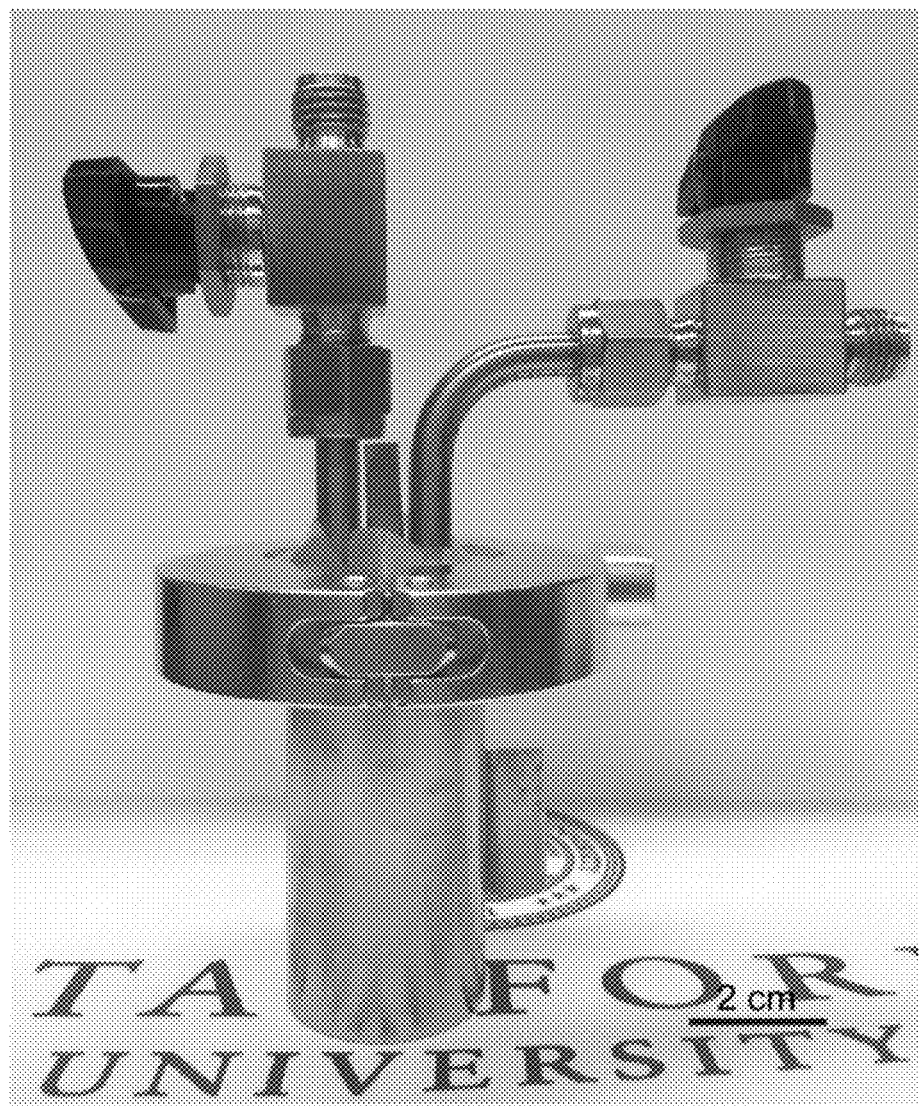
FIG. 5. A prototypical Ni—H$_2$ cylindrical testing cell.

The fabrication and energy storage mechanism of the advanced Ni—$H_2$ battery is schematically depicted in FIG. 1a. It is constructed in a custom-made cylindrical cell by rolling a $Ni(OH)_2$ cathode, polymer separator and NiMoCo catalyzed anode into a steel vessel, similar to the fabrication of commercial AA batteries. An about 30% potassium hydroxide (KOH) solution is used as an electrolyte. The steel vessel is equipped with a gas inlet and outlet to remove air and to direct the hydrogen flow into and out of the cell when desired. A prototypical Ni—$H_2$ testing cell is shown in FIG. 5. During charge, the cathode $Ni(OH)_2$ is oxidized to NiOOH meanwhile hydrogen gas is evolved from the alkaline electrolyte on the anode via the NiMoCo catalyzed HER. During discharge, the cathode NiOOH is reduced back to $Ni(OH)_2$ and hydrogen gas is oxidized on the anode via the NiMoCo catalyzed HOR. The redox reactions of the advanced Ni—$H_2$ cell during charge and discharge can be described as:

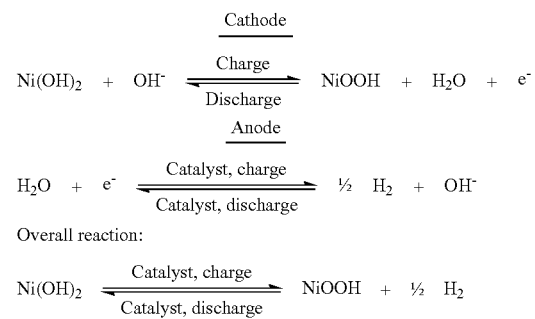

Figure 6:
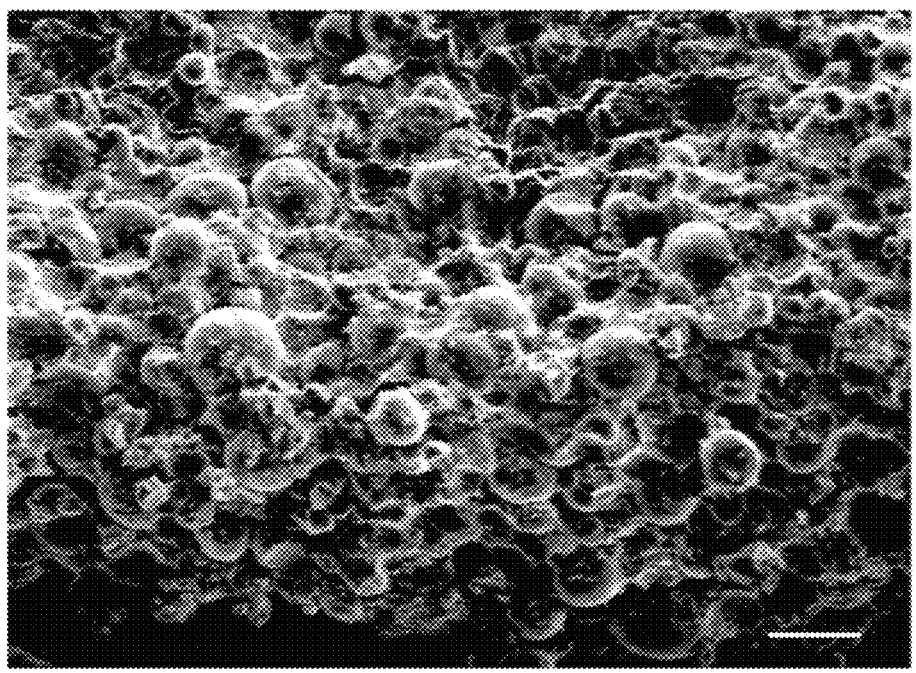
FIG. 6. SEM of Ni(OH)$_2$ microspheres on the cathode, scale bar: 20 µm.
Figure 7:
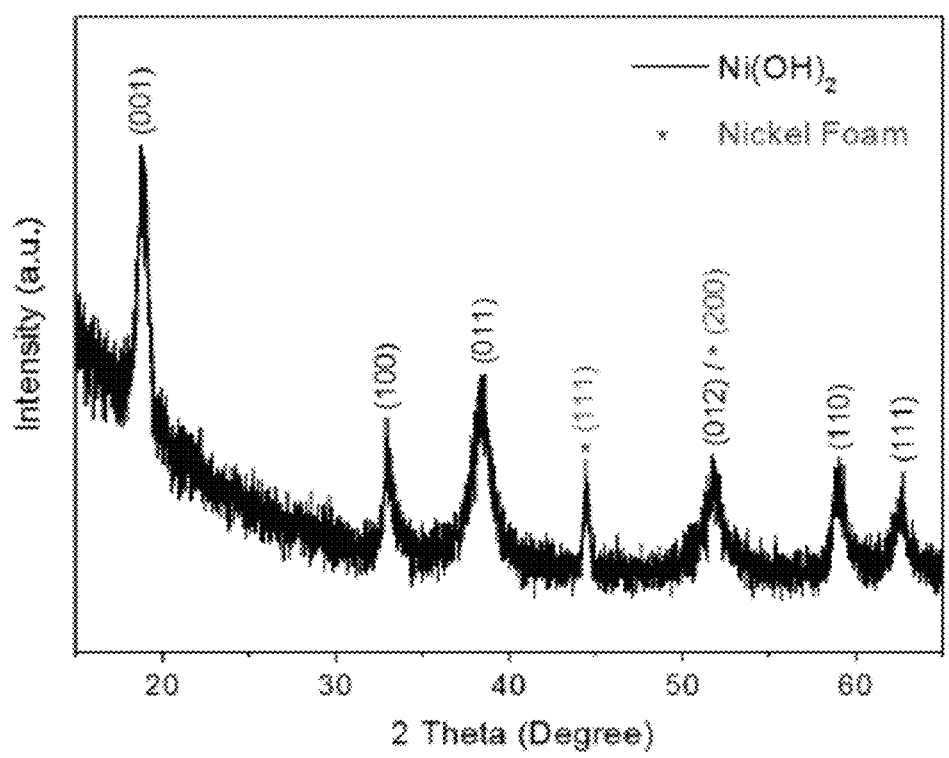
FIG. 7. X-ray diffraction (XRD) of the Ni(OH)$_2$ cathode. The asterisk peaks are ascribed to the nickel foam.
Figure 8:
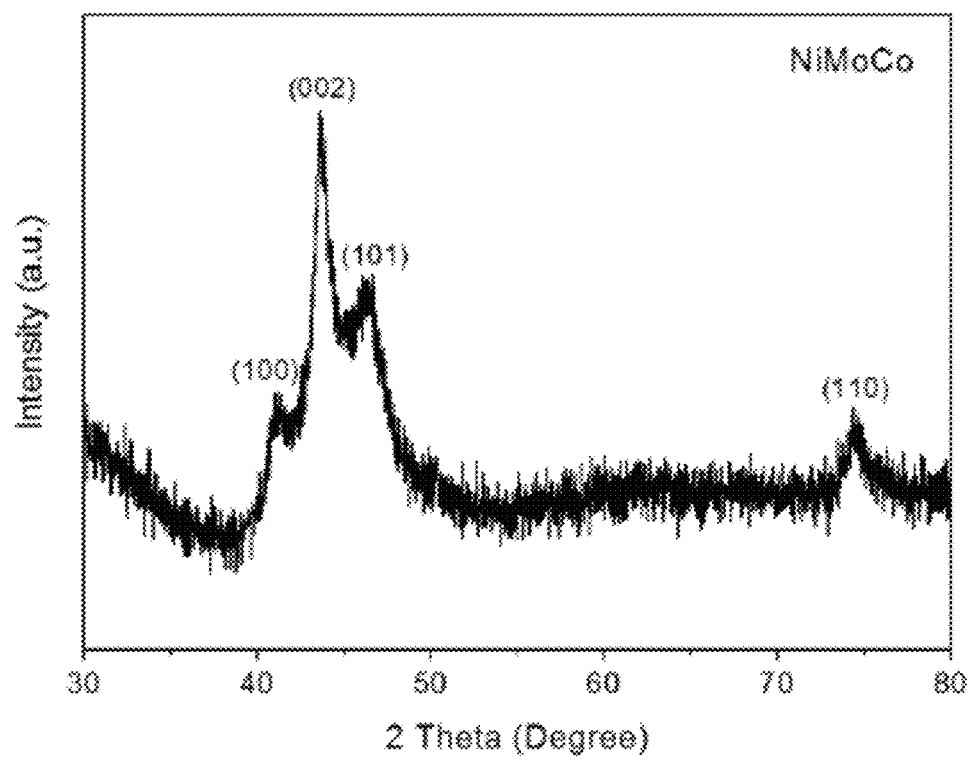
FIG. 8. XRD of the NiMoCo alloy.
Figure 9:
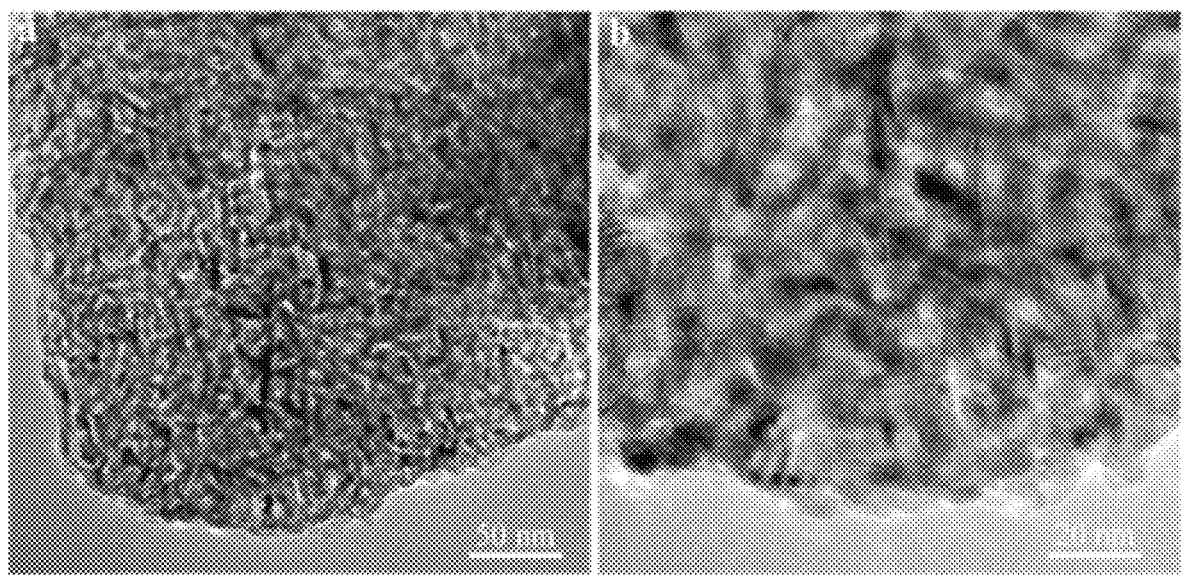
FIG. 9. Transmission electron microscopy (TEM) images of the NiMoCo alloy.
Figure 10:
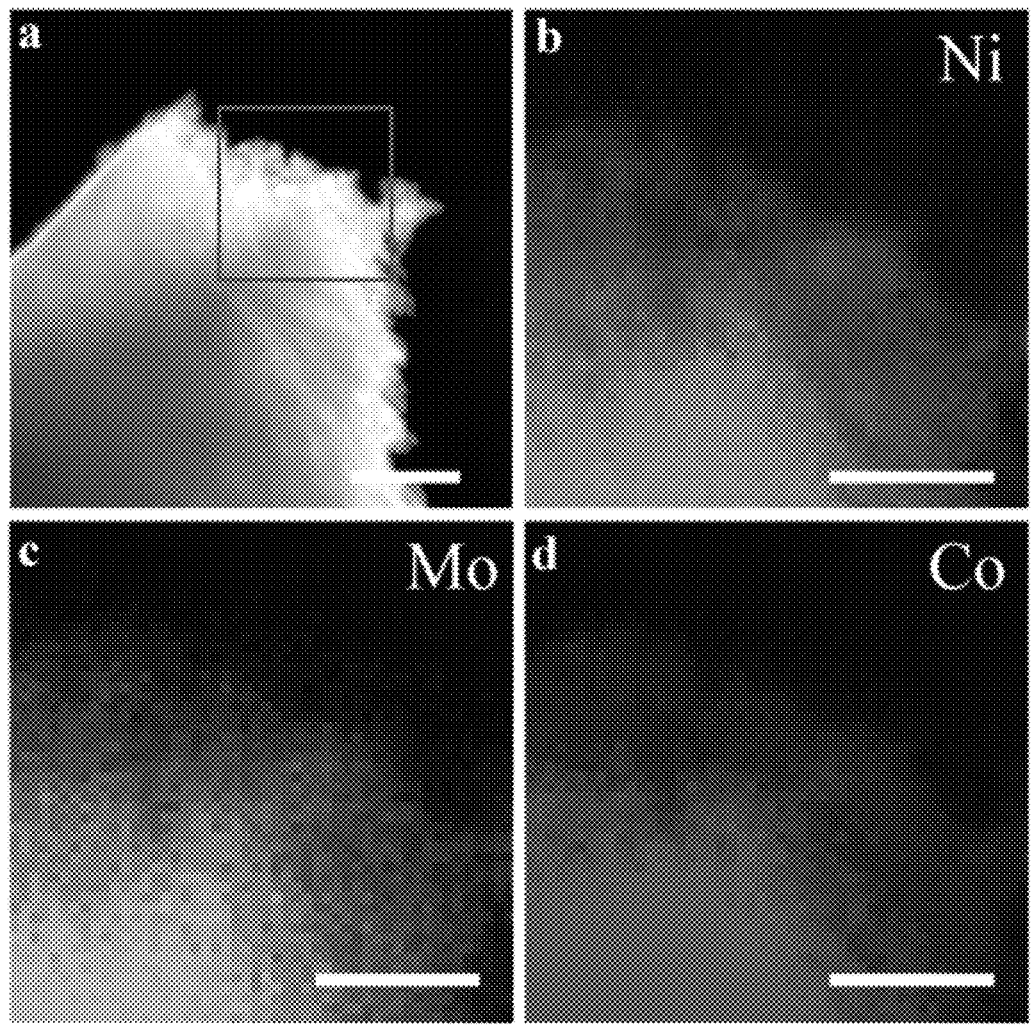
FIG. 10. Scanning transmission electron microscopy (STEM) mapping of NiMoCo. a, An STEM image of the NiMoCo alloy (scale bar, 100 nm). The elemental mapping of b, Ni, c, Mo and d, Co (scale bars, 50 nm).

FIG. 1b illustrates the electrode configuration and specification of the Ni—$H_2$ cell. The cathode was made by heavily coating micrometer sized $Ni(OH)_2$ spheres (Inset in FIG. 1c) into nickel foam to form a compact electrode (FIG. 6). Scanning electron microscopy (SEM) images show that the $Ni(OH)_2$ cathode has an average thickness of about 700 μm (FIG. 1c). Due to the high density of the $Ni(OH)_2$ microsphere, the tap density of the cathode is about 2.6 g $cm^{-3}$, corresponding to a high mass loading of about 182 mg $cm^{-2}$. The $Ni(OH)_2$ was further characterized by X-ray diffraction (XRD) to be β-phase (FIG. 7), which is the most stable phase in the Ni(OH)$_2$ family. The large thickness, high mass loading and tap density of the Ni(OH)$_2$ electrode are among those of industry levels, allowing the Ni—H$_2$ cells into practical energy storage applications. In contrast, the anode is comprised of a three-dimensional (3D) thin layer of NiMoCo catalyst, which was directly grown on porous nickel foam without any conducting additive or binder (FIG. 1b). XRD confirmed the crystal phase of the NiMoCo alloy (FIG. 8). High resolution scanning electron microscopy (SEM) images reveal that the NiMoCo comprises of many interconnected nanoparticles (Inset in FIG. 1d). It is further disclosed by transmission electron microscopy (TEM) that the NiMoCo nanoparticles are in the range of tens of nanometers (FIG. 9). The scanning transmission electron microscopy (STEM) and the elemental mapping of the NiMoCo alloy demonstrate the uniform distribution of the individual elements of Ni, Mo and Co (FIG. 10). The developed NiMoCo electrode has some unique features to the M-H$_2$ battery. 1) Due to the 3D characteristic of the nickel foam, the resulting NiMoCo electrode retains the macroporous hierarchical nature (FIG. 1d). Meanwhile, the interconnected NiMoCo nanoparticles give rise to the formation of nanopores in between, making the porous NiMoCo electrode with highly accessible surface for fast battery charge and discharge reactions. 2) The generated hydrogen gas can be readily evolved on the porous anode in the charge process and be effectively oxidized in the discharge process. 3) The nickel foam skeletons are interconnected virtually free-of-junction, assuring high electrical conductivity of the electrodes for good battery operation.

Figure 2:
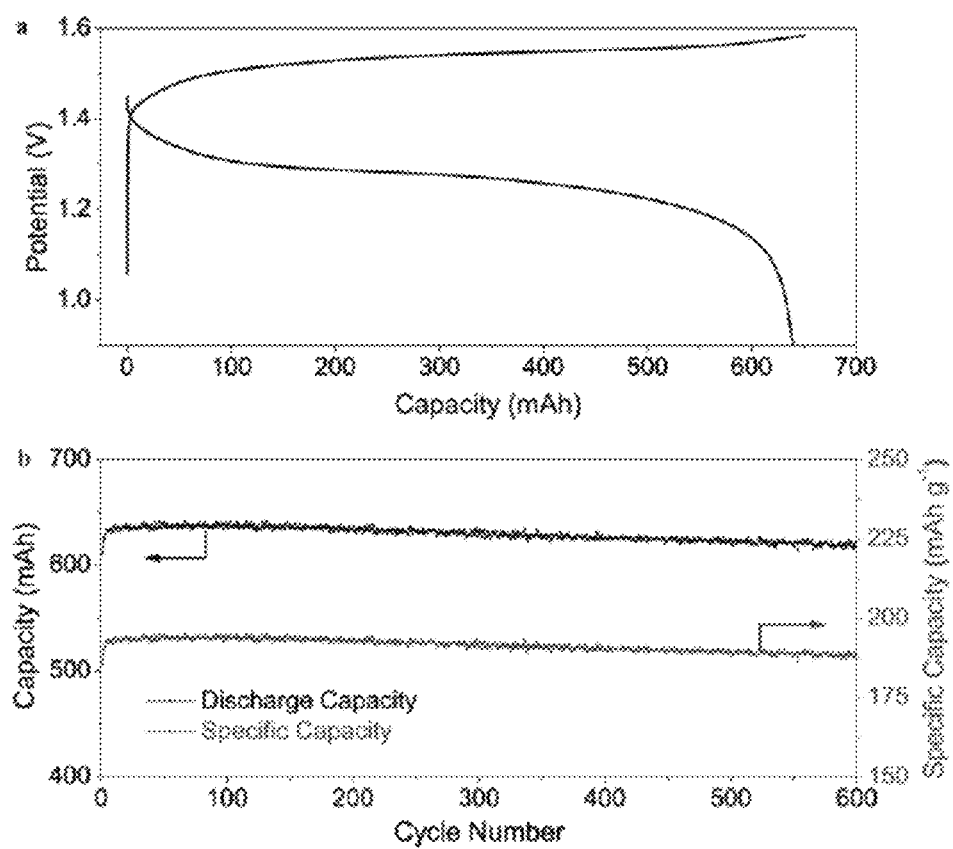
FIG. 2. Electrochemical performance of the advanced Ni—H$_2$ cylindrical cell. a, Galvanostatic charge-discharge curve of the cell at a current of about 50 mA. b, Cycle stability of the cell at a constant current of about 100 mA.
Figure 11:
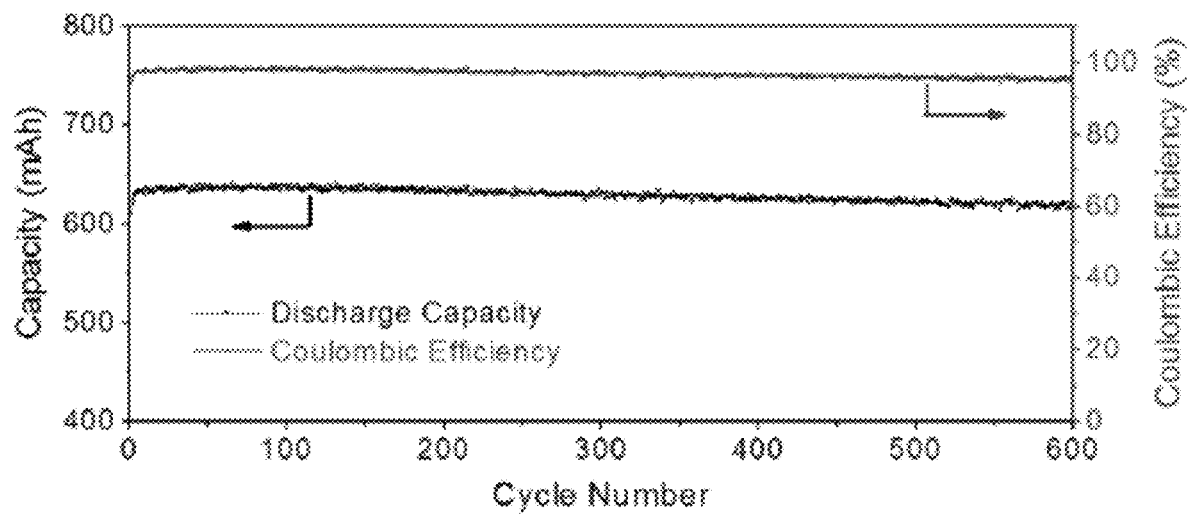
FIG. 11. Discharge capacity and Coulombic efficiency of the cylindrical Ni—$H_2$ cell over 600 cycles.
Figure 12:
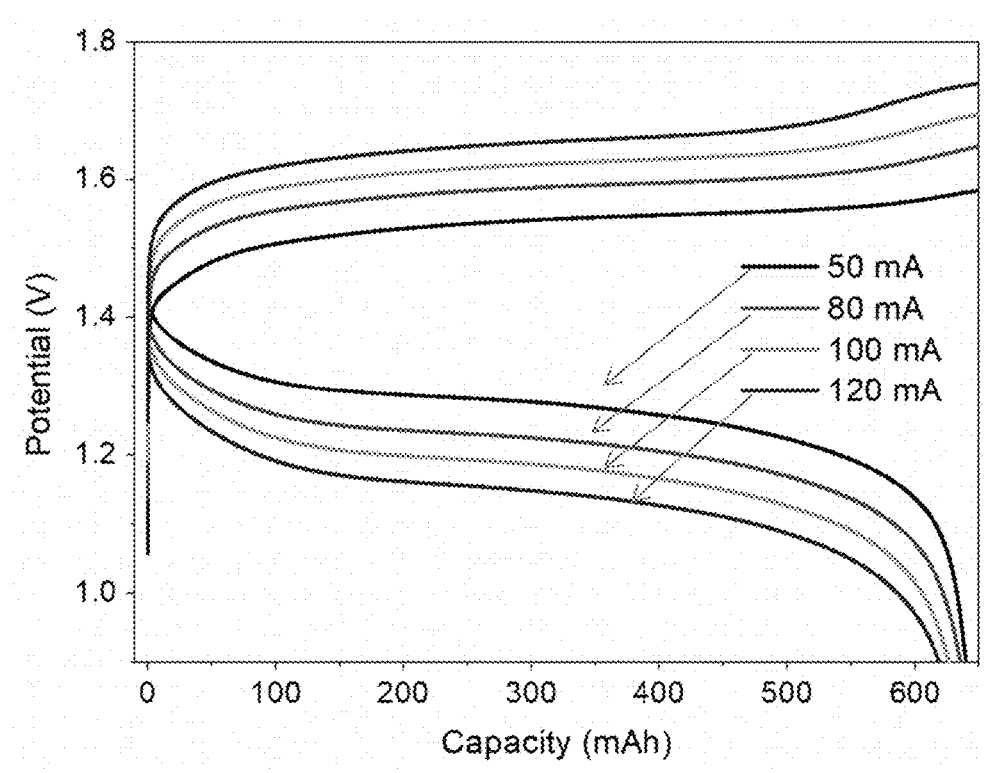
FIG. 12. Charge and discharge of the Ni—$H_2$ cylindrical cell under different current densities of about 50, about 80, about 100 and about 120 mA.
Figure 13:
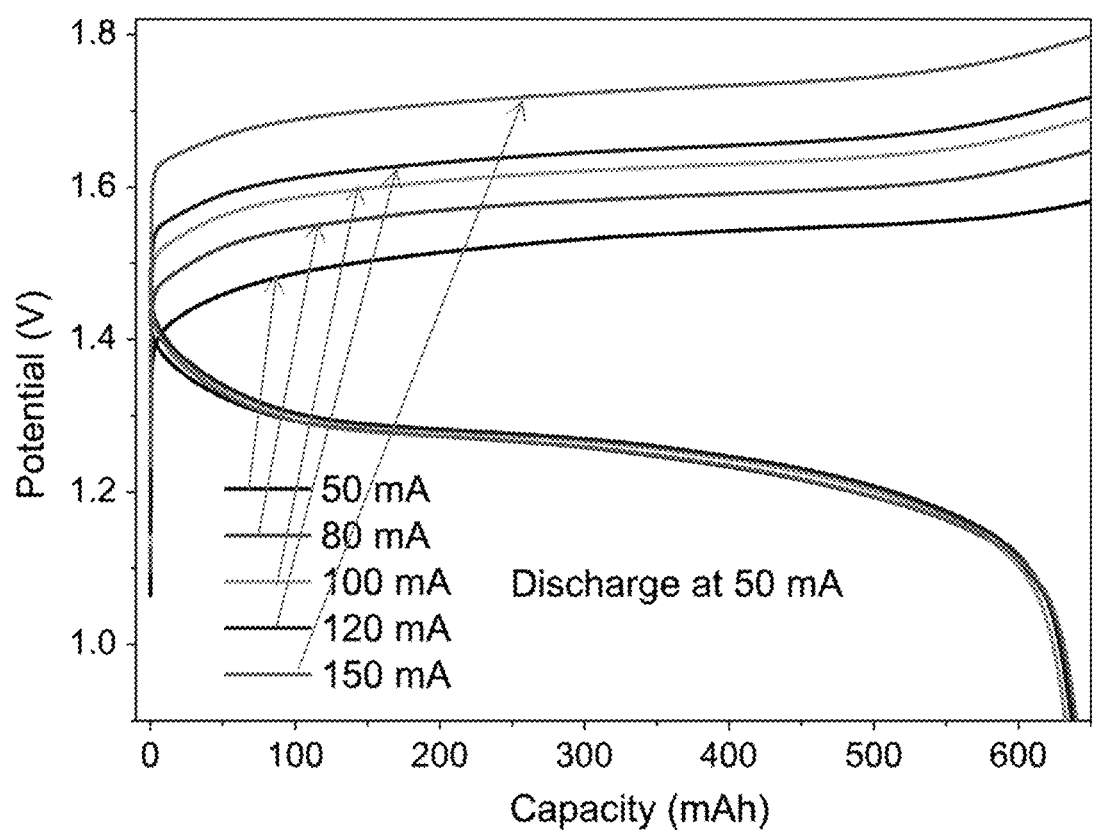
FIG. 13. Fast charge rates of the Ni—$H_2$ cylindrical cell. The charge and discharge curves of the cell under different charge currents of about 50, about 80, about 100, about 120 and about 150 mA and a constant discharge current of about 50 mA.

FIG. 2 demonstrates the electrochemical performance of the advanced Ni—H$_2$ cylindrical cell using the compact Ni(OH)$_2$ cathode and 3D NiMoCo anode. The galvanostatic charge and discharge tests at a constant current of about 50 mA (about 2.78 mA cm$^{-2}$) represent distinct charge and discharge plateaus at about 1.55 V and about 1.25 V, respectively (FIG. 2a), which agree well with the reaction potentials between Ni(OH)$_2$/NiOOH and HER/HOR. The Ni—H$_2$ cylindrical cell can achieve high discharge capacity of about 640 mAh, which corresponds to a specific capacity of about 195 mAh (based on the mass of Ni(OH)$_2$) and areal capacity of about 35.5 mAh cm$^{-2}$. Impressively, the advanced Ni—H$_2$ cell exhibits excellent rechargeability, retaining above about 95% of the initial capacity (FIG. 2b) and Coulombic efficiency (the ratio of discharge capacity over charge capacity, in FIG. 11) after 600 cycles at a current of about 100 mA (about 5.56 mA cm$^{-2}$). Meanwhile, remarkable rate capability is achieved in the Ni—H$_2$ cell, as proven by charging and discharging it under different current densities (FIG. 12). The Ni—H$_2$ cell can be operated under fast charge mode. A set of charge-discharge measurements show that the discharge capacities of the Ni—H$_2$ cell at current density of about 50 mA kept almost the same under different charge current densities (from about 50 mA to about 150 mA) (FIG. 13). The energy density of the Ni—H$_2$ cylindrical cell is calculated to be about 140 Wh kg$^{-1}$ (normalized to the mass of all components in the cell but excluding the steel vessel) which is higher than the nickel-cadmium (40-60 Wh kg$^{-1}$) and lead-acid batteries (30-50 Wh kg$^{-1}$). On the basis of the electrochemical performance, the energy cost of the materials utilization in the advanced Ni—H$_2$ cylindrical cell is estimated to be about \$83 kWh$^{-1}$, achieving the DOE cost target of \$100 kWh$^{-1}$ for large-scale energy storage applications. Notably, the capital cost of the Ni—H$_2$ system can be further reduced by optimization of the electrode materials and the battery operation system.

Figure 14:
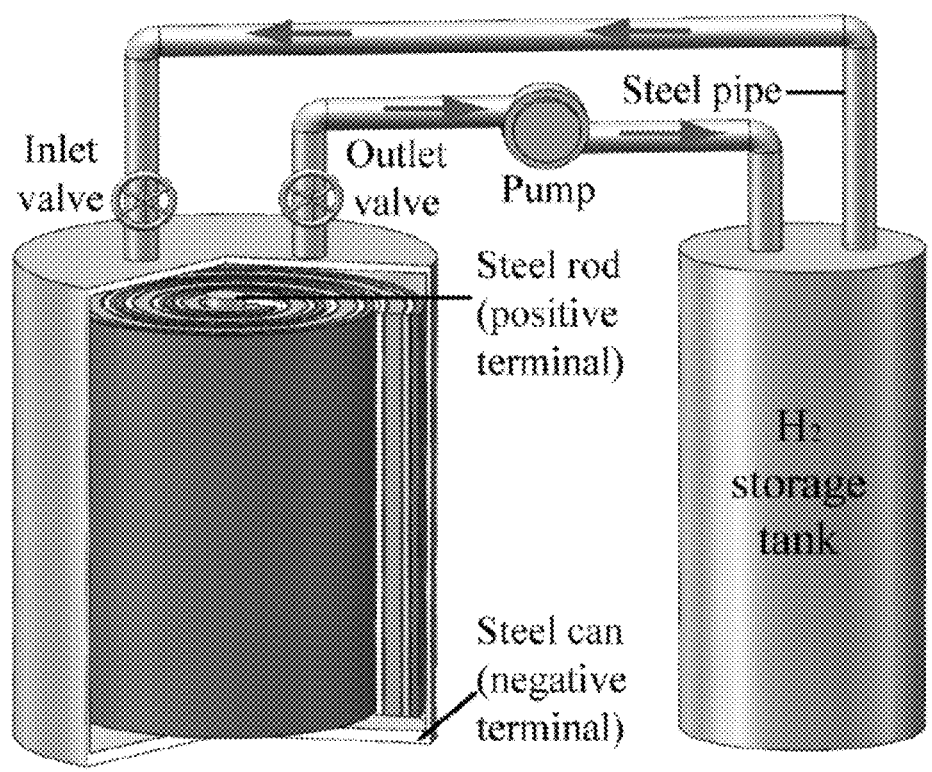
FIG. 14. Schematic of a semi-flowable Ni—$H_2$ cylindrical cell.
Figure 15:
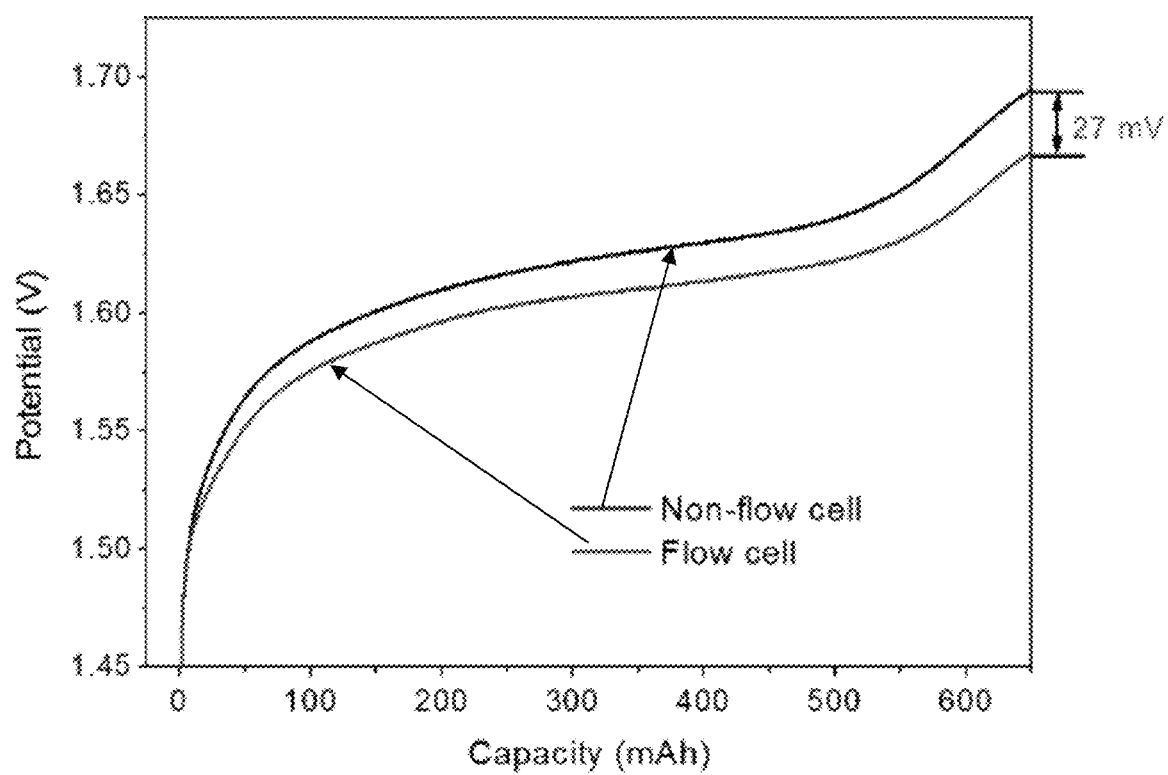
FIG. 15. Charge behaviors of the semi-flowable and non-flowable Ni—$H_2$ cells.

A semi-flowable battery system is proposed to manage the advanced Ni—H$_2$ cells for the improvement of overall cell performance. As illustrated in FIG. 14, the semi-flowable cells are constructed by connecting one or multiple individual Ni—H$_2$ cells with a hydrogen storage tank (details in Supplementary Information). The hydrogen storage tank serves as an external energy collector and reservoir to one or more of the connected cells. The advanced semi-flowable configuration contributes to the system with some particular advantages. 1) The charge process of the semi-flowable Ni—H$_2$ cells operates under ambient pressure, making them less dependent on the high pressure vessel. Therefore, it provides an efficient pathway to the reduction of the manufacturing cost upon the utilization of the pressure vessel. 2) The ambient-pressure charge process is favorable to the charge overpotential. For example, about 27 mV of the decrease of the charge overpotential is achieved in the flowable Ni—H$_2$ cell due to the kinetically favorable reaction for hydrogen generation (FIG. 15). The reduction of the overpotential is believed to contribute to the improvement of the system efficiency. 3) The discharge of the semi-flowable Ni—H$_2$ cells can be controlled by the flow of the hydrogen gas into the cells. 4) The advanced semi-flowable system is tolerant to the cell overcharge/overdischarge, realized by dissipating the overcharge/overdischarge induced gases (mainly O$_2$) out of the system. 5) The flow of the hydrogen gas in the system is self-driven by the internal gas pressure. Different from a liquid flow that typically specifies an external pump in redox-flow batteries, the gas flow in Ni—H$_2$ battery system is spontaneous and self-balanced in a constrained space. Moreover, the speed of gas flow is faster than a liquid and consumes less energy. This is a great advantage for the flowable Ni—H$_2$ battery system where a pump or other external force can be omitted, leading to the simplicity and cost reduction of the system design. 6) The Ni—H$_2$ cells and the hydrogen tank can be separated completely for various applications. As such, the charged Ni—H$_2$ cells with low hydrogen pressure can be treated as dispatchable sources of electricity for better transportation without carrying the hydrogen tank. Meanwhile, the hydrogen tank with high purity hydrogen gas storage can be treated as an independent fuel resource for other applications. (7) The individual cells can be electrically connected in series or parallel to provide high output voltage or current, respectively.

Figure 3:
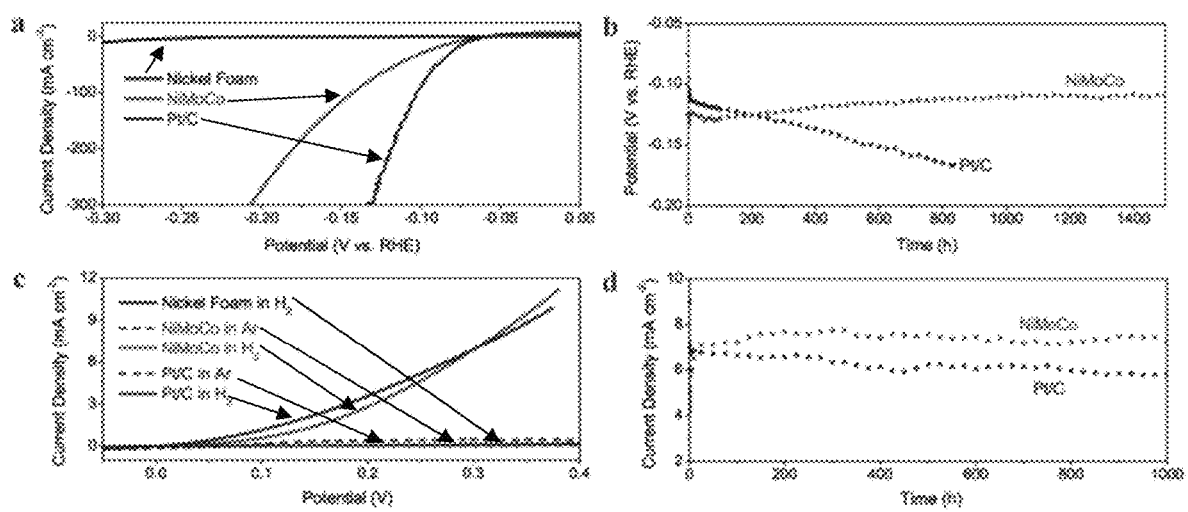
FIG. 3. Electrocatalytic performance of the bi-functional NiMoCo electrode for hydrogen evolution/oxidation reactions (HER/HOR). a, HER polarization curves of nickel foam, NiMoCo and Pt/C on nickel foam. b, Chronopotentiometric stability tests of NiMoCo and Pt/C electrodes under constant current density of about 20 mA cm$^{-2}$. The HER tests were performed in a three-electrode setup in the electrolyte of about 30% KOH. c, HOR polarization curves of nickel foam, NiMoCo and Pt/C on nickel foam under Ar and H$_2$ atmospheres. d, Chronoamperometric stability tests of NiMoCo and Pt/C electrodes at constant potential of about 0.3 V. The HOR tests were conducted in a two-electrode setup under H$_2$ atmosphere in the electrolyte of about 30% KOH.

The outstanding electrochemical performance of the advanced Ni—H$_2$ cell is ascribed to the electrocatalytic properties of the NiMoCo electrode toward both HER and HOR. Over the past few decades, tremendous efforts have been devoted to the development of low-cost, highly active hydrogen catalysts for HER or HOR. However, there remains a demand for the fabrication of low-cost bi-functional electrocatalysts for both HER and HOR. Evaluation is made of the electrocatalytic performance of the NiMoCo alloys as a bi-functional hydrogen electrode for HER/HOR. The HER activity of the catalyst was tested in a typical three-electrode configuration. The nickel foam substrate and Pt/C coated nickel foam are included for comparison. As shown in FIG. 3a, Pt/C and NiMoCo exhibit significantly higher current densities than that of the nickel foam, indicating the negligible HER activity of the nickel foam and significant activity of the Pt/C and NiMoCo catalysts. The exceptional HER activity of NiMoCo approaches the benchmark Pt/C catalyst. An overpotential of about 80 mV for NiMoCo drives a hydrogen generation current density of about 10 mA cm$^{-2}$, which is highly comparable to that of the Pt/C catalyst which has an overpotential of about 71 mV. To reach a high current density of about 200 mA cm$^{-2}$, the applied overpotential of the NiMoCo electrode is as low as about 180 mV, making it one of the most active non-precious electrocatalysts toward HER in alkaline solutions. Remarkably, the NiMoCo demonstrates outstanding long-term stability, showing no noticeable activity degradation over about 1500 hours of hydrolysis at current density of about 20 mA cm$^{-2}$ (FIG. 3b). As comparison, the Pt/C catalyst shows gradual activity degradation over about 800 hours of hydrolysis, probably due to the detachment of the Pt/C from the nickel foam which is caused by generous hydrogen evolution bubbles.

A two-electrode setup is applied to test the HOR activity of the catalysts. FIG. 3c shows the polarization curves of the nickel foam, Pt/C and NiMoCo on nickel foam under different gas conditions. The anodic current above zero is an indicator of hydrogen oxidation. It shows that the Pt/C and NiMoCo have negligible activities toward HOR under argon atmosphere, virtually because of the limited availability of hydrogen gas in the testing cell. Nickel foam shows no detectable HOR activity under hydrogen atmosphere. In comparison, both Pt/C and NiMoCo exhibit the typical polarization curves with large current densities under hydrogen atmosphere, indicating their excellent HOR activities. The NiMoCo was found to have an onset potential of 0 V toward HOR, which is the same as that of the Pt/C, confirming its unprecedented HOR catalytic performance. Long-term stability tests are performed toward the HOR activity of NiMoCo. Impressively, the NiMoCo electrode shows negligible activity degradation over about 1000 hours of consecutive hydrogen oxidation (FIG. 3d). In contrast, the Pt/C electrode shows slight activity decay over long term (FIG. 3d). The outstanding HER/HOR activities of the NiMoCo make it an exceptional bi-functional hydrogen catalyst for the M-H$_2$ battery application.

Figure 16:
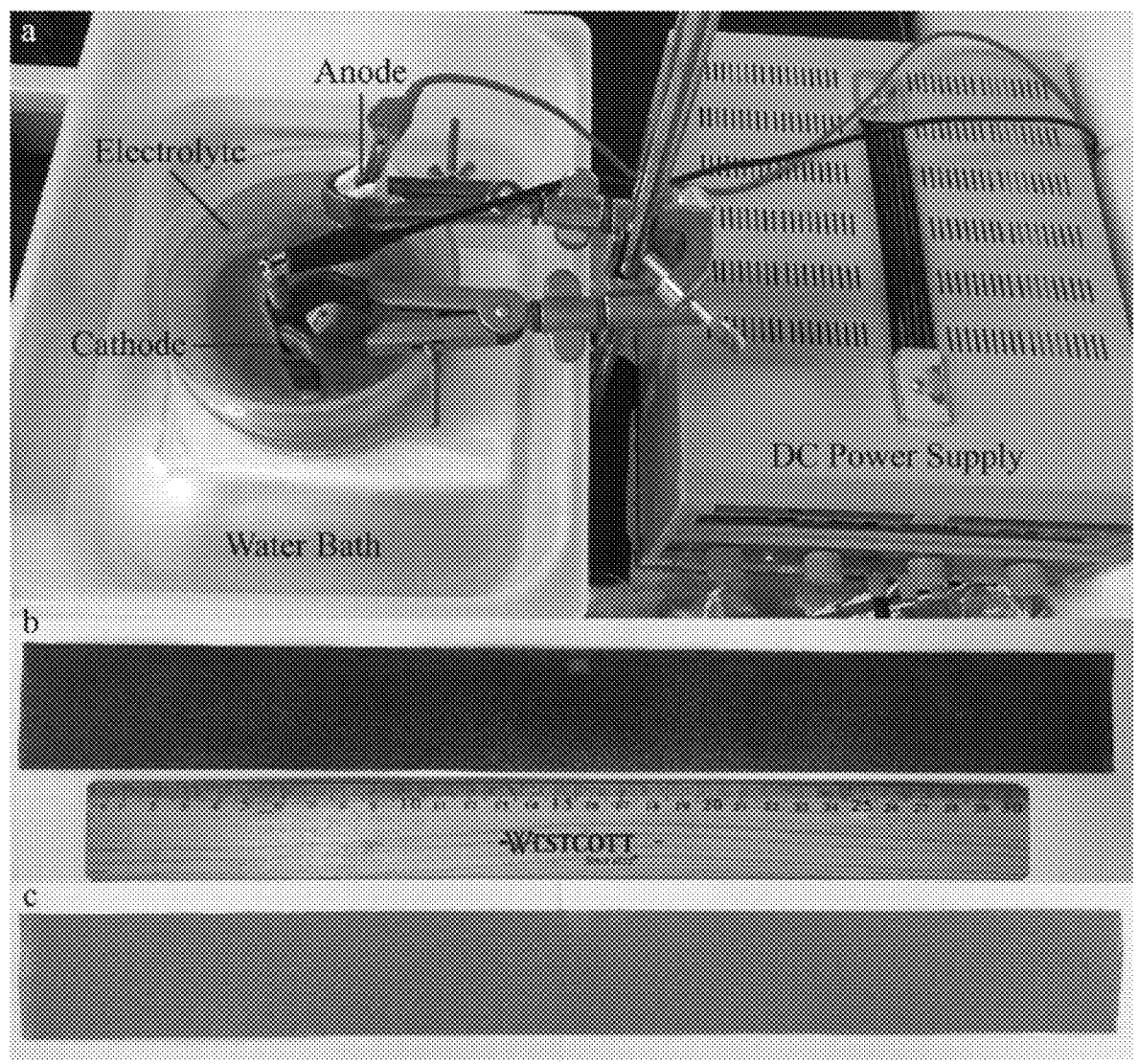
FIG. 16. Fabrication of the NiMoCo electrode in large-scale by the electrodeposition. a, The two-electrode setup of an electrodeposition apparatus. Digital photographs of the NiMoCo on nickel foam b, before and c, after the annealing treatment.
Figure 17:
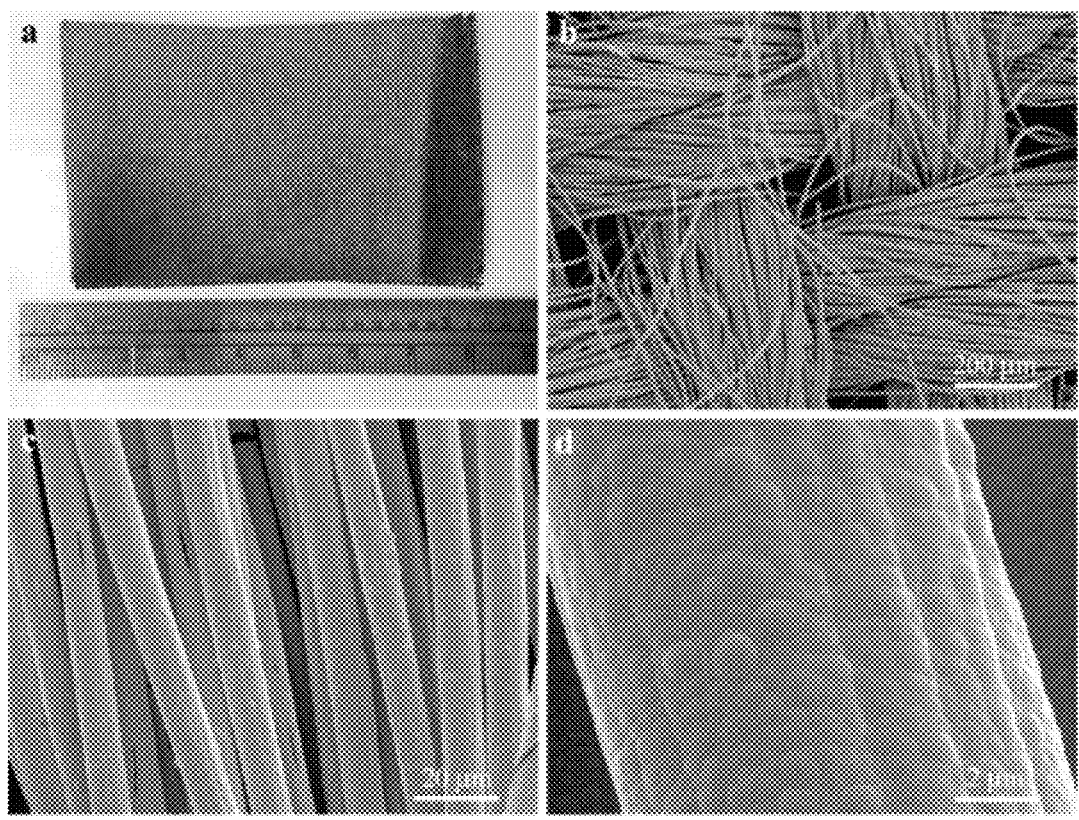
FIG. 17. NiMoCo catalysts on carbon cloth. a, A digital photograph of the NiMoCo-carbon cloth. b, c, and d, SEM images of the NiMoCo on carbon cloth.

The development of the NiMoCo catalyst as the 3D hydrogen electrode provides many advantages over a slurry coated Pt/C catalysts. 1) As compared to the costly Pt/C, the use of low-cost NiMoCo as the hydrogen catalyst can dramatically reduce the battery cost, making it highly desirable for large-scale energy storage application. 2) The electrochemical deposition of the NiMoCo catalyst on nickel foam gives rise to a 3D electrode with no carbon additive or polymer binder, which improves the electrode conductivity and also avoids the carbon oxidation induced catalyst failure or the possible catalytic poisons. 3) The DC power supplied two-electrode deposition is of large-scale fabrication (FIG. 16), allowing the development of Ni—H$_2$ cells for large-scale applications. 4) The electrodeposition of NiMoCo is applicable to any conductive substrates. In this regard, the NiMoCo alloys are successfully deposited onto nickel foam and foil, stainless steel mesh and foil, and carbon fiber cloth (FIG. 17). 5) The composition, morphology and thickness of the NiMoCo can be well controlled by the electrodeposition, which provides a general approach to the optimization of the NiMoCo catalyst and to the fabrication of other metal/metal alloys for many widespread applications.

Figure 4:
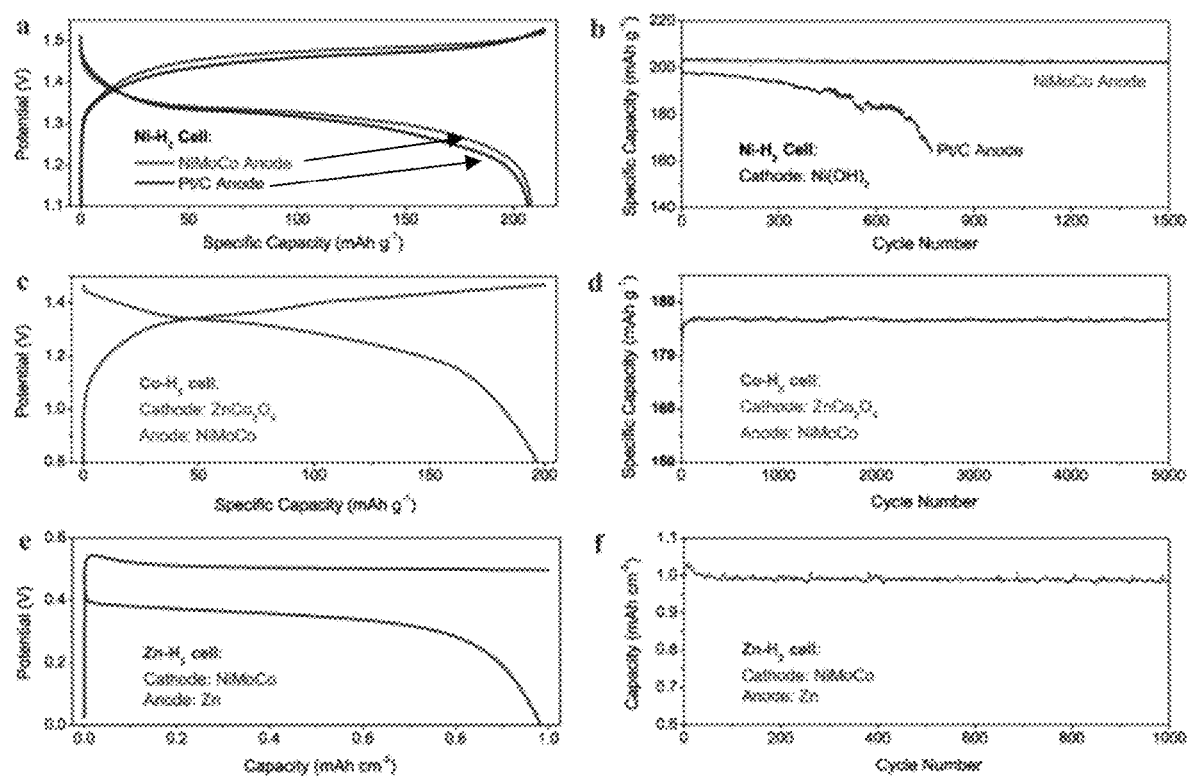
FIG. 4. Different metal-hydrogen Swagelok cells. a, Galvanostatic charge-discharge curves of the Ni—H$_2$ Swagelok cells under current density of about 5 mA cm$^{-2}$. b, Long-term cycle stability behaviors of the Ni—H$_2$ cells at current density of about 10 mA cm$^{-2}$. The Ni—H$_2$ Swagelok cells were fabricated using Ni(OH)$_2$ cathode, Pt/C and NiMoCo anode in about 30% KOH electrolyte. c, Galvanostatic charge-discharge curves of the Co—H$_2$ Swagelok cells under current density of 1 mA cm$^{-2}$. d, Long-term cycle stability of the Co—H$_2$ cell at current density of about 5 mA cm$^{-2}$. The Co—H$_2$ Swagelok cell was fabricated using ZnCo$_2$O$_4$ cathode and NiMoCo anode in about 30% KOH electrolyte. e, Galvanostatic charge-discharge curves of the Zn—H$_2$ Swagelok cells under current density of about 1 mA cm$^{-2}$. f, The long-term cycle stability of Zn—H$_2$ Swagelok cell at current density of about 5 mA cm$^{-2}$. The Zn—H$_2$ Swagelok cell was fabricated using NiMoCo cathode and Zn foil anode in the electrolyte of about 30% KOH with addition of about 0.5 M ZnO.
Figure 19:
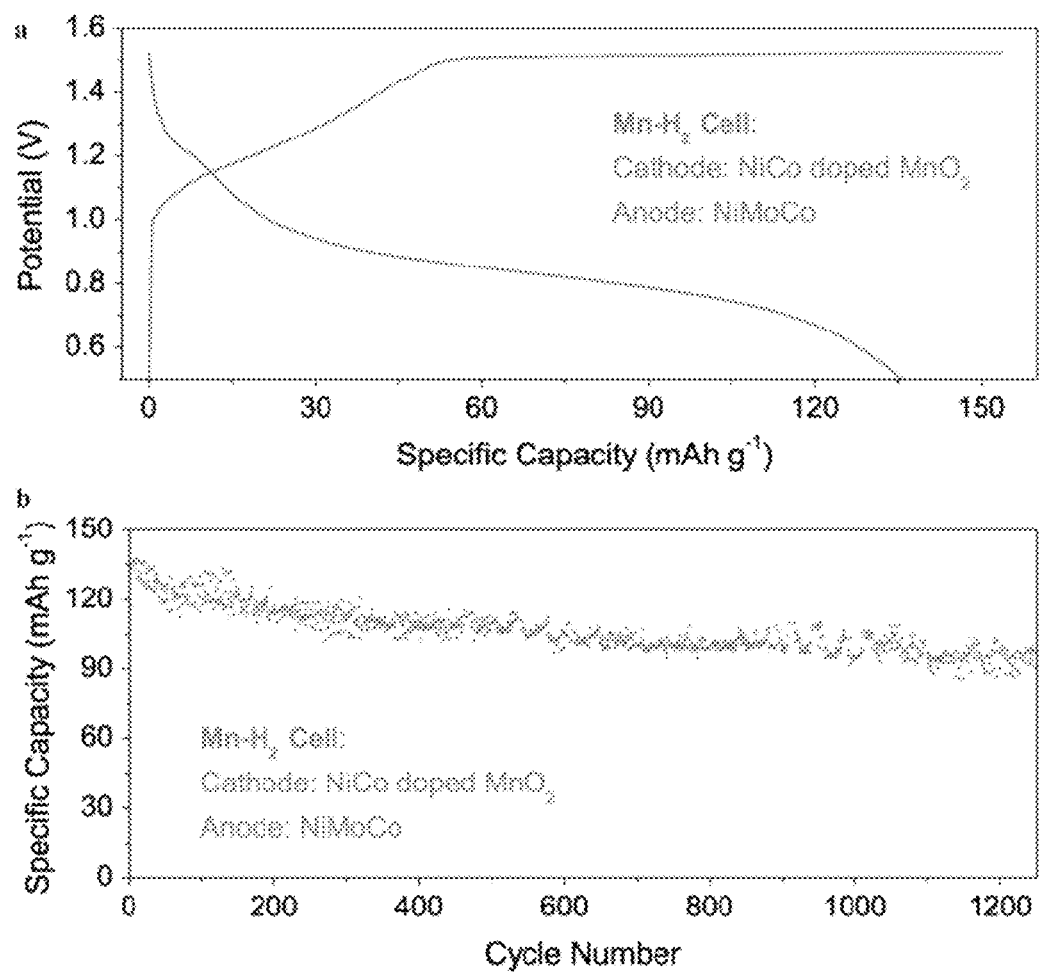
FIG. 19. Electrochemical performance of Mn—$H_2$ Swagelok cell. a, The galvanostatic charge-discharge curves under current density of about 1 mA cm$^{-2}$. b, The cycling performance of the Mn—$H_2$ cell.
Figure 20:
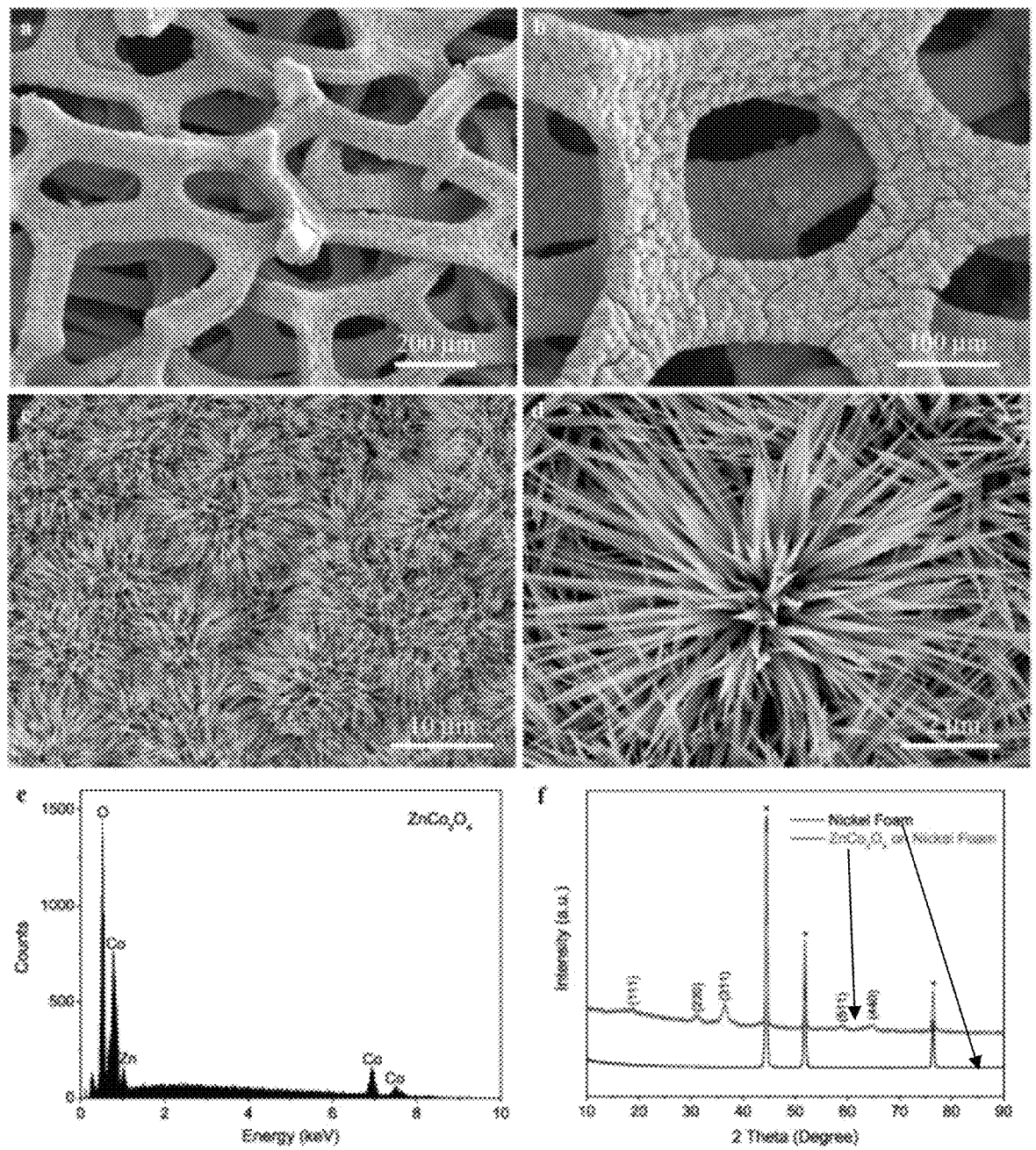
FIG. 20. $ZnCo_2O_4$ cathode for Co—$H_2$ cell. a, b, c, and d, SEM images of the $ZnCo_2O_4$ cathode. e, Energy-dispersive X-ray spectroscopy (EDX) and f, XRD of the $ZnCo_2O_4$ on nickel foam.
Figure 21:
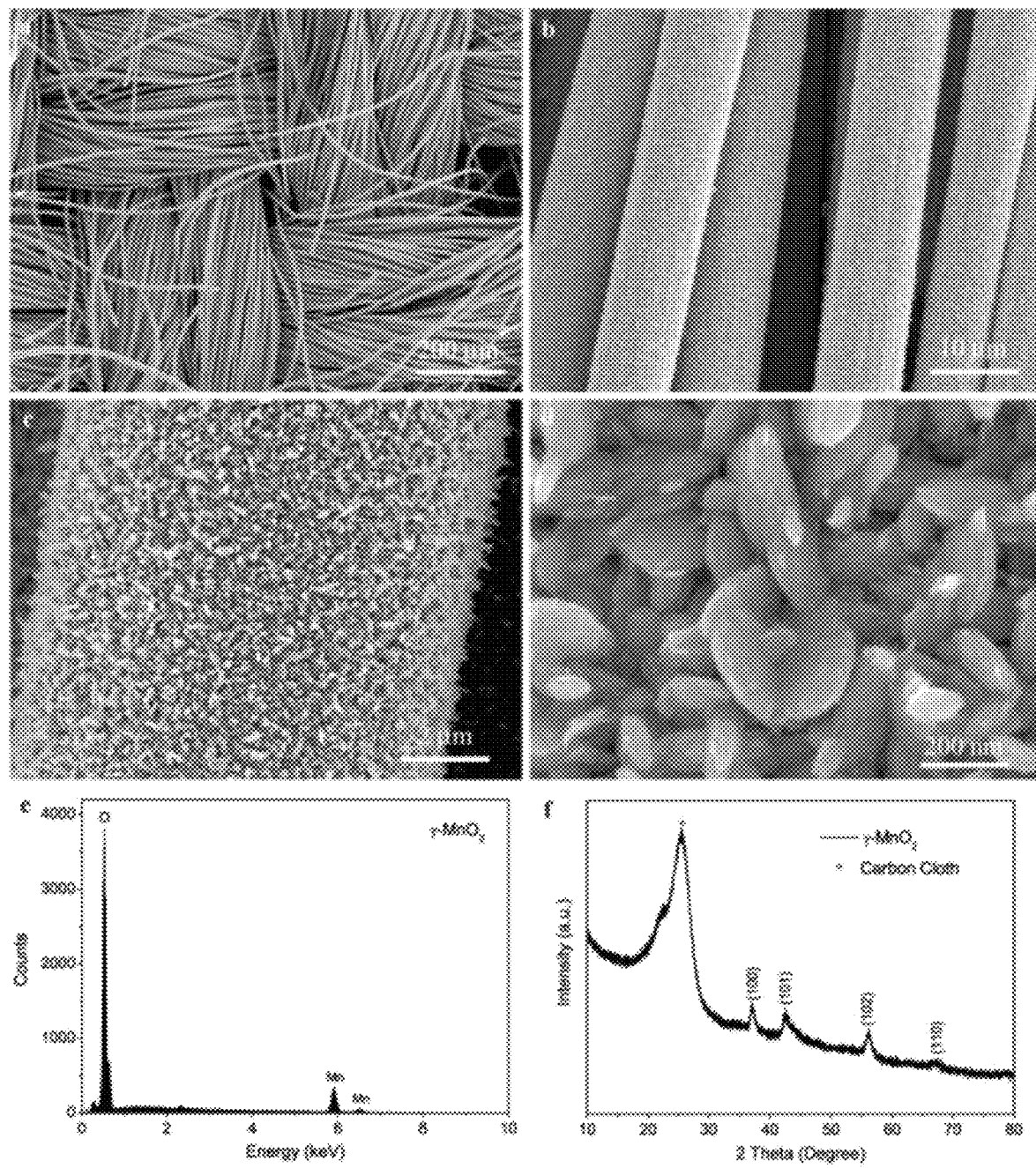
FIG. 21. Ni and Co doped electrolytic manganese dioxide cathode for Mn—$H_2$ cell. a, b, c, and d, SEM images of the $MnO_2$ cathode. e, EDX and f, XRD of the $MnO_2$ on carbon cloth.

To demonstrate the generality of the M-H$_2$ battery chemistry, small-sized Swagelok cells are developed (FIG. 18) to test a series of low-cost metals (Ni, Co, Mn, and Zn)—H$_2$ systems. The metal electrodes, separator and NiMoCo or Pt/C catalyzed hydrogen electrode are laminated in stacks for the assembly of the Swagelok cells. FIG. 4 presents the electrochemical performance of four different M-H$_2$ cells. The Ni—H$_2$ Swagelok cell was fabricated by using Ni(OH)$_2$ cathode and NiMoCo or Pt/C anode. The galvanostatic charge-discharge curves demonstrate the similar electrochemical behaviors of the Ni—H$_2$ Swagelok cell by the deployment of NiMoCo and Pt/C anode (FIG. 4a). As compared to the Pt/C anode, the cell with the NiMoCo anode shows better discharge characteristic and a slightly higher discharge capacity. Impressively, the Ni—H$_2$ Swagelok cell with the NiMoCo anode exhibits outstanding long-term cycle stability, showing negligible capacity decay over 1500 cycles (FIG. 4b). However, the Ni—H$_2$ cell with the Pt/C anode shows gradual capacity degradation over cycling. FIGS. 4c and d depict the electrochemical behaviors of the Co—H$_2$ Swagelok cell by using ZnCo$_2$O$_4$ cathode (FIG. 20) and the NiMoCo anode. The Co—H$_2$ cell shows distinct charge and discharge voltage plateaus in the ranges of about 1.3-1.4 V and about 1.2-1.3 V, respectively. The small overpotential of about 110 mV (at about 100 mAh g$^{-1}$) is superior to that of the Ni—H$_2$ cell, due to the nanostructured ZnCo$_2$O$_4$ cathode with fast charge storage kinetics. The consecutive charge and discharge cycling of the Co—H$_2$ cell demonstrates very stable long-term rechargeability, showing no capacity loss over 5000 cycles. In the case of the Mn—H$_2$ Swagelok cell, the electrolytic manganese dioxide with a small amount of nickel and cobalt doping was chosen as the cathode by pairing with the NiMoCo anode (FIG. 21). The charge-discharge profiles of the Mn—H$_2$ cell exhibit the similar electrochemical behavior as that of MnO$_2$ alkaline batteries. The Mn—H$_2$ cell shows slow capacity decay over consecutive cycling, retaining a capacity of about 100 mAh g$^{-1}$ after 1200 cycles (FIG. 19). Nevertheless, it is a significant improvement of the cycle stability from the Mn based alkaline batteries, demonstrating the superior capability of the Mn—H$_2$ cell. Furthermore, the NiMoCo electrocatalyst can be employed as a cathode for the M-H$_2$ cells such as Zn—H$_2$ cell due to its suitable redox potential of HER/HOR versus Zn plating/stripping reactions. As such, the Zn—H$_2$ cell was fabricated by using Zn foil as the anode and NiMoCo as the cathode in the electrolyte of about 30% KOH with addition of about 0.5 M ZnO. The Zn—H$_2$ cell shows a discharge plateau of about 0.4 V (FIG. 4e), which corresponds to the potential difference between the Zn anode and the NiMoCo cathode. Due to the excellent electrocatalytic performance of the NiMoCo electrode, the Zn—H$_2$ cell shows no capacity decay over 1000 cycles. The electrochemical performance of the M-H$_2$ cells by the application of the NiMoCo demonstrates the remarkable electrocatalytic activity of the NiMoCo as a universal bi-functional HER/HOR catalyst in alkaline electrolyte.

In conclusion, a class of metal-hydrogen batteries is developed using redox-active metal (Ni, Co, and Mn) cathode and a low-cost NiMoCo catalyzed hydrogen anode. The advanced Ni—H$_2$ cell shows a high energy density of about 140 Wh kg$^{-1}$ with excellent rechargeability over 1500 cycles. The low energy cost of about US$83 kWh$^{-1}$ achieves the DOE target of US$100 kWh$^{-1}$, which makes it desirable for the large-scale energy storage application. Further optimization of the materials and systems can be performed for improved electrochemical performance.

Supplementary Information:
Methods
Preparation of NiMoCo and Pt/C Electrodes

A two-electrode cathodic deposition was used to synthesize NiMoCo alloys onto 3D porous nickel foam substrates. The deposition was conducted on a DC power supply (Dr. Meter DC Power Supply HY5020E) by taking a piece of nickel foam as cathode and titanium mesh as anode under current density of about 80 mA cm$^{-2}$ with respect to the cathode. The deposition solution was prepared by dissolution of nickel (II) chloride hexahydrate (NiCl$_2$·6H$_2$O, about 11.9 g L$^{-1}$), sodium molybdate dihydrate (Na$_2$MoO$_4$·2H$_2$O, about 2.42 g L$^{-1}$), cobalt (II) chloride hexahydrate (CoCl$_2$·6H$_2$O, about 0.35 g L$^{-1}$), sodium bicarbonate (NaHCO$_3$, about 74.77 g L$^{-1}$) and sodium pyrophosphate tetrabasic (Na$_4$P$_2$O$_7$, about 34.57 g L$^{-1}$) into DI water at room temperature. Hydrazine hydrate (about 1.2 mL L$^{-1}$) was added to the solution right before the deposition. The nickel foam was pressed and cleaned by sonication in acetone and DI water for about 10 minutes separately before the electrodeposition. Cold water bath was applied to the deposition solution. The deposition solution was kept stirring during the whole deposition process. After the electrodeposition, the NiMoCo coated nickel foam was cleaned by DI water and immersed in about 10 M KOH for about 24 hours. It was then cleaned by DI water and dried in air. Subsequently, the NiMoCo coated nickel foam was annealed in a tube furnace at about 450° C. for about 1 h under forming gas atmosphere (about 95% Ar with about 5% H$_2$). The tube furnace was cooled naturally and the NiMoCo coated nickel foam was taken out and kept in vacuum box for further use. In the preparation of Pt/C electrode, the commercially available Pt/C powder (HiSPEC platinum 40% on carbon, Fuel cell store, USA) was mixed with polyvinylidene fluoride (PVDF) in a ratio of about 9:1 in N-Methyl-2-pyrrolidone (NMP) to form a slurry with concentration of about 20 mg mL$^{-1}$. The suspension was stirred for at least about 24 hours and then was subjected to a bath sonication of about 30 minutes before coating onto the nickel foam. The nickel foam was immersed into the Pt/C suspension for about 1 minute and then taken out for drying in vacuum oven at about 80° C. Multiple times of the immersion-soaking-drying process were applied to increase the loading of Pt/C on the nickel foam.

Preparation of Ni(OH)$_2$ZnCo$_2$O$_4$, and MnO$_2$ Cathodes

The Ni(OH)$_2$ cathode with industrial-level mass loading of about 180 mg cm$^{-2}$ was prepared by a slurry coating of Ni(OH)$_2$ microspheres (Panasonic) onto nickel foam. The ZnCo$_2$O$_4$ cathode was grown directly onto nickel foam current collector by a hydrothermal reaction. Typically, zinc nitrate hexahydrate (Zn(NO$_3$)$_2$·6H$_2$O, about 1 mmol), cobalt (II) nitrate hexahydrate (Co(NO$_3$)$_2$·6H$_2$O, about 2 mmol), ammonium fluoride (NH$_4$F, about 2 mmol) and urea (CO (NH$_2$)$_2$, about 5 mmol) were dissolved into DI water (about 35 mL) under vigorous stirring. A piece of nickel foam (about 3 cm*4 cm) pre-cleaned by ethanol and water was immersed into the solution and placed into a Teflon-lined stainless autoclave. The sealed autoclave was heated to about 150° C. within about 0.5 hour and maintained at about 150° C. for about 5 hours. After cooling naturally to room temperature, the nickel foam was taken out and cleaned by abundant amount of water and ethanol with the aid of about 10 s bath sonication. The sample was then dried under vacuum and calcinated in air at about 350° C. for about 2 hours. Ni and Co doped γ-MnO$_2$ (electrolytic manganese dioxide) was prepared by a three-electrode deposition, where the carbon cloth, Ag/AgCl electrode and graphite rod served as working, reference and counter electrodes, respectively. The deposition solution was prepared by dissolving manganese (II) sulfate monohydrate (MnSO$_4$·H$_2$O, about 48 g L$^{-1}$), sulfuric acid (H$_2$SO$_4$, about 95-98%, about 24 g L$^{-1}$) with nickel (II) sulfate hexahydrate (NiSO$_4$·6H$_2$O, about 2% of MnSO$_4$) and cobalt (II) sulfate heptahydrate (CoSO$_4$·7H$_2$O, about 2% of MnSO$_4$) into DI water. A current density of about 20 mA cm$^{-2}$ was applied to deposit Ni and Co doped MnO$_2$ onto the conductive carbon cloth at temperature of 90 (±3) ° C. for about 5 minutes. Afterwards, the sample was cleaned by DI water and allowed to dry in vacuum.

Fabrication of Swagelok and Cylindrical Cells

Figure 18:
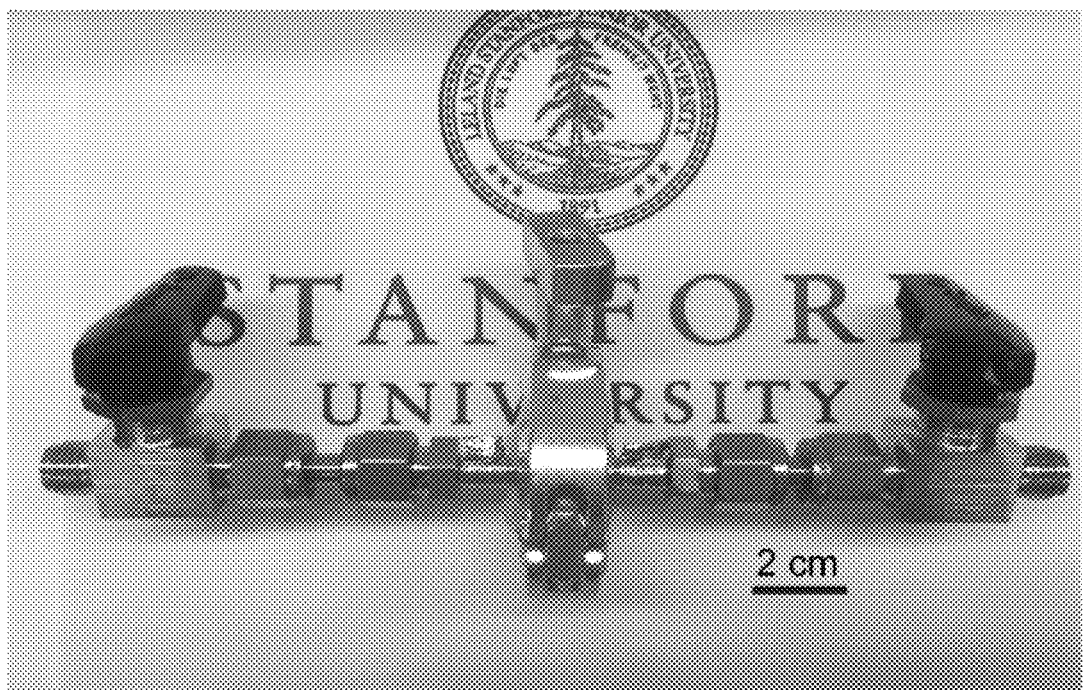
FIG. 18. A prototypical Swagelok cell.

The Swagelok cell was built up by clamping two KF to Swagelok adapters in a PTFE-centered O-ring (FIG. 18). The adapters were equipped with inlet and outlet valves to remove trapped air from the cell and to connect it with external hydrogen tank for the semi-flowable cell when desired. The cathode (Ni(OH)$_2$ on nickel foam, ZnCo$_2$O$_4$ on nickel foam, EMD on carbon cloth), separator (ZYK-15, Zircar Zirconia, Inc. USA), and the anode (NiMoCo/Pt/C on nickel foam) were laminated in a coin-cell stack and assembled into the Swagelok cell. A thin layer of insulating PTFE film was inserted between the stainless steel adapter and the aluminum clamp to avoid the contact of the cathode and the anode. The electrolyte was freshly prepared by dissolving about 30 wt. % KOH in DI water.

The advanced Ni—H$_2$ cylindrical cell was constructed by clamping a KF to Swagelok adapter with a stainless steel cylinder in a PTFE-centered O-ring (FIG. 5). The adapter and the stainless steel cylinder were machined in a machine shop. The adapter was connected with a three-way valve on its outside, while its inside was welded with a steel rod which serves as cathode terminal. A piece of Ni(OH)$_2$ electrode wrapping with polymer separator (Freudenberg, Germany) on its both sides and a piece of NiMoCo anode were stacked and surrounded on the steel rod to make a cylinder-like cell configuration. The cathode was spot welded to the stainless steel rod for good electronic conductivity. The electrodes were then put into the stainless steel cylinder where the NiMoCo anode was directly contacted with the cylinder and served as anode terminal. A freshly prepared about 30 wt. % KOH electrolyte was added to the cell. The Ni—H$_2$ cylindrical cell was purged with high purity hydrogen gas (about 99.99%, Airgas) to remove the trapped air. The sealed cell was allowed to sit for over about 12 hours before the electrochemical measurements.

Fabrication and Operation of Semi-Flowable Ni—H$_2$ Cylindrical Battery

The semi-flowable Ni—H$_2$ battery system was formed by connecting one of more individual Ni—H$_2$ cells with a hydrogen storage tank through steel pipelines (FIG. 14). The hydrogen storage tank has a higher pressure than what is specified for the Ni—H$_2$ cell. During charge, the cathode Ni(OH)$_2$ is oxidized to NiOOH meanwhile hydrogen gas is generated on the anode via the NiMoCo catalyzed hydrogen evolution reaction. The gas inlet valve is kept off while the outlet valve is kept on in the whole charge process, in order to let the generated gas flow out of the cell to the hydrogen storage tank. The charge of the semi-flowable Ni—H$_2$ battery was conducted under ambient pressure. During discharge, the gas outlet valve is turned off while the inlet valve is turned on to fill the cell with hydrogen. The cathode is therefore reduced back to Ni(OH)$_2$ and hydrogen gas is oxidized on the anode via the NiMoCo catalyzed hydrogen oxidation reaction in the discharge process.

Electrochemical Measurements

The electrochemical tests of the M-H$_2$ batteries were conducted in Biologic VMP3 multi-channel electrochemical workstations (Bio-Logic Inc. France) and LandHe battery testers (Wuhan, China) at room temperature. Galvanostatic charge-discharge measurements were performed by charging the cells at different currents to a set cut-off capacity and discharging them to a set cut-off voltage.

The electrocatalytic activity of the NiMoCo and Pt/C anodes toward HER was conducted in a three-electrode configuration by taking the NiMoCo or Pt/C on nickel foam as a working electrode, saturated calomel electrode (SCE) as a reference electrode and a graphite rod as a counter electrode. The reference electrode was calibrated with respect to reversible hydrogen electrode (RHE) in $H_2$ saturated about 0.1 M KOH electrolyte, yielding a relation of E(RHE)=E (SCE)+1.01 V. Linear sweep voltammetry curve was recorded at about 1 mV/s between about −0.9 and about −1.6 V (vs. SCE). Long-term chronopotentiometric stability test was conducted using a Hg/HgO reference electrode by applying a constant current density of about 20 mA $cm^{-2}$. The electrolyte is about 30 wt. % KOH. The reported current density is normalized to the geometric area of the electrodes.

The electrocatalytic activity of the NiMoCo and Pt/C anodes toward HOR was conducted in a two-electrode configuration by using the NiMoCo or Pt/C on nickel foam as a working electrode and a graphite rod as a counter electrode. The fabrication of the HOR test cell is the same as that of the Swagelok cell. The catalysts were tested under hydrogen and argon atmosphere in the sealed Swagelok cell separately. Linear sweep voltammetry curve was recorded at about 1 mV/s between about −0.1 and about 0.4 V. Long-term chronoamperometric stability test was conducted under a constant potential of about 0.3 V.

Materials Characterization

The materials were characterized by X-ray diffraction (XRD), scanning electron microscopy (SEM) and transmission electron microscopy (TEM). The crystallinity and structure of the materials were determined by PANalytical X'Pert diffractometer using copper K-edge X-rays. The morphology of the products was observed by FEI XL30 Sirion SEM. TEM and energy-dispersive X-ray spectroscopy (EDX) were conducted on FEI Tecnai G2 F20 X-TWIN TEM.

Cost Evaluation of the Ni—$H_2$ Cylindrical Cell

The capital energy cost of the cell is estimated on the basis of the equation:

$$C = \Sigma_i P_i m_i / E_d$$

where C is the capital energy cost per discharge energy in unit of US dollar per kilowatt-hour (US\$ $kWh^{-1}$), $P_i$ is the specific cost of each component in US\$ $kg^{-1}$, $m_i$ is the mass of the specific component in kg, and $E_d$ is the discharge energy in kWh. The price of the transition metals (Ni: US\$14 $kg^{-1}$, Mo: US\$26 $kg^{-1}$, Co: US\$90 $kg^{-1}$) are obtained from www.infomine.com. The price of separator (US\$2 $m^{-2}$) and KOH (US\$1 $kg^{-1}$) are obtained from Alibaba.com. Detailed cost calculation of the cell is exhibited in Table 1.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is circular or spherical can refer to a diameter of the object. In the case of an object that is non-circular or non-spherical, a size of the object can refer to a diameter of a corresponding circular or spherical object, where the corresponding circular or spherical object exhibits or has a particular set of derivable or measurable characteristics that are substantially the same as those of the non-circular or non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the terms "connect," "connected," and "connection" refer to an operational coupling or linking. Connected objects can be directly coupled to one another or can be indirectly coupled to one another, such as via one or more other objects.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

TABLE 1

Cost evaluation of the advanced Ni—$H_2$ cylindrical cell.

| | Cathode (Ni(OH)$_2$) | Anode (NiMoCo) | Current Collector (Ni Foam) | Separator | Electrolyte (KOH) | Total |
|---|---|---|---|---|---|---|
| $m_i$ (g) | 3.27 | 0.57 | 1.36 | 0.072 | 0.4 | 5.672 |
| P (\$) | 0.029 | 0.0107 | 0.019 | 0.0072 | 0.0004 | 0.0663 |
| $E_d$ (Wh) | | | | | | 0.796 |
| E (Wh/kg) | | | | | | 140 |
| C (\$/kWh) | | | | | | 83.3 |

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A metal-hydrogen battery, comprising:
a first electrode comprising (i) a first porous conductive substrate having a three-dimensional (3D) network frame defining first micropores therein and (ii) microspheres comprising a transition metal compound, wherein the microspheres are disposed in the first micropores of the 3D network frame;
a second electrode that generates hydrogen gas during charging and oxidizes hydrogen gas during discharging; and
an electrolyte disposed between the first electrode and the second electrode,
wherein the second electrode includes:
a second porous conductive substrate comprising a plurality of second micropores; and
a 3D layer of bi-functional catalyst comprising a transition metal alloy having two or more metals selected from nickel, molybdenum, and cobalt and disposed on surfaces of the second micropores of the second porous conductive substrate to catalyze both hydrogen evolution reaction and hydrogen oxidation reaction at the second electrode, wherein the 3D layer of bi-functional catalyst is in a form of interconnected nanoparticles having nanopores formed between the interconnected nanoparticles, and wherein the nanopores of the 3D layer of bi-functional catalyst are different from and smaller than the second micropores of the second porous conductive substrate, wherein the 3D layer of bi-functional catalyst does not fill the second micropores entirely such that the second electrode retains a macroporous structure.

2. The metal-hydrogen battery of claim 1, wherein the second porous conductive substrate includes a metal foam or a metal alloy foam.

3. The metal-hydrogen battery of claim 1, wherein the transition metal alloy includes a nickel-molybdenum-cobalt alloy.

4. The metal-hydrogen battery of claim 1, wherein the first porous conductive substrate includes a metal foam or a metal alloy foam.

5. The metal-hydrogen battery of claim 1, wherein the transition metal compound includes nickel.

6. The metal-hydrogen battery of claim 1, wherein the transition metal compound includes cobalt.

7. The metal-hydrogen battery of claim 1, wherein the transition metal compound includes manganese.

8. The metal-hydrogen battery of claim 1, wherein the electrolyte is an aqueous electrolyte.

9. The metal-hydrogen battery of claim 1, wherein the electrolyte is alkaline.

10. The metal-hydrogen battery of claim 1, further comprising an enclosure within which the first electrode, the second electrode, and the electrolyte are disposed, and the enclosure includes an inlet valve, an inlet, which is fluidly connected to the inlet valve, an outlet valve, and an outlet, which is fluidly connected to the outlet valve.

11. The metal-hydrogen battery of claim 10, further comprising a storage tank to store hydrogen gas, and a pump fluidly connected between the outlet, through the outlet valve, and the storage tank.

12. A metal-hydrogen battery, comprising:
a cathode including (i) a first porous conductive substrate having a three-dimensional (3D) network frame defining first micropores therein and (ii) microspheres comprising a redox-reactive material that includes a transition metal, wherein the microspheres are disposed in the first micropores of the 3D network frame;
a catalytic hydrogen anode that generates hydrogen gas during charging and oxidizes hydrogen gas during discharging, the catalytic hydrogen anode including:
a second porous conductive substrate comprising a plurality of second micropores; and
a 3D layer of bi-functional catalyst disposed on surfaces of the second micropores of the second porous conductive substrate, wherein the 3D layer of bi-functional catalyst includes a transition metal alloy having two or more metals selected from nickel, molybdenum, and cobalt and is in a form of interconnected nanoparticles having nanopores formed between the interconnected nanoparticles, and wherein the nanopores of the 3D layer of bi-functional catalyst are different from and smaller than the second micropores of the second porous conductive substrate, wherein the 3D layer of bi-functional catalyst does not fill the second micropores entirely such that the catalytic hydrogen anode retains a macroporous structure; and
an alkaline electrolyte disposed between the cathode and the catalytic hydrogen anode.

13. The metal-hydrogen battery of claim 12, wherein the transition metal alloy is a nickel-molybdenum-cobalt alloy.

14. The metal-hydrogen battery of claim 12, wherein the transition metal is selected from one or more of nickel, cobalt, and manganese.

15. The metal-hydrogen battery of claim 12, wherein each of the first porous conductive substrate and the second porous conductive substrate includes a metal foam or a metal alloy foam.

16. The metal-hydrogen battery of claim 12, wherein the alkaline electrolyte is an aqueous electrolyte.

* * * * *